(12) United States Patent
Finkelstein et al.

(10) Patent No.: US 12,482,055 B2
(45) Date of Patent: Nov. 25, 2025

(54) SYSTEMS AND METHODS FOR MEMORY-EFFICIENT PIXEL HISTOGRAMMING

(71) Applicant: AEYE, Inc., Dublin, CA (US)

(72) Inventors: Hod Finkelstein, Albany, CA (US); Noah Bronstein, Dublin, CA (US); Allan Steinhardt, Dublin, CA (US)

(73) Assignee: AEye. Inc., Dublin, CA (US)

( * ) Notice: Subject to any disclaimer, the term of this patent is extended or adjusted under 35 U.S.C. 154(b) by 325 days.

(21) Appl. No.: 18/066,647

(22) Filed: Dec. 15, 2022

(65) Prior Publication Data

US 2023/0196501 A1 Jun. 22, 2023

Related U.S. Application Data

(63) Continuation of application No. PCT/US2022/052775, filed on Dec. 14, 2022.

(60) Provisional application No. 63/304,603, filed on Jan. 29, 2022, provisional application No. 63/291,387, filed on Dec. 18, 2021.

(51) Int. Cl.
| | |
|---|---|
| G06T 1/60 | (2006.01) |
| G01S 7/48 | (2006.01) |
| G01S 7/4863 | (2020.01) |
| G01S 17/89 | (2020.01) |
| G06T 7/55 | (2017.01) |
| G06T 7/77 | (2017.01) |

(52) U.S. Cl.
CPC ............. *G06T 1/60* (2013.01); *G01S 7/4808* (2013.01); *G01S 7/4863* (2013.01); *G01S 17/89* (2013.01); *G06T 7/55* (2017.01); *G06T 7/77* (2017.01); *G06T 2207/10028* (2013.01); *G06T 2207/20021* (2013.01)

(58) Field of Classification Search
CPC .... G06T 1/60; G06T 7/55; G06T 7/77; G06T 2207/10028; G06T 2207/20021; G01S 7/4808; G01S 7/4863; G01S 17/89
See application file for complete search history.

(56) References Cited

U.S. PATENT DOCUMENTS

| | | | |
|---|---|---|---|
| 2018/0209846 A1* | 7/2018 | Mandai | G01S 17/08 |
| 2022/0043118 A1* | 2/2022 | Pacala | G01S 7/4863 |

* cited by examiner

*Primary Examiner* — Matthew C Bella
*Assistant Examiner* — Jinsu Hwang
(74) *Attorney, Agent, or Firm* — Ahmann Kloke LLP

(57) ABSTRACT

Techniques for resolving a range to an object using histograms are disclosed. A frame collection time for a depth-image frame is divided into a plurality of different collection subframes, where each collection subframe encompasses a plurality of light pulse cycles. Counts of accumulated photon detections by a pixel during the different collection subframes are allocated to histogram bins using different bin maps for the collection subframes. Each bin map defines a different mapping of time to bins for the light pulse cycles within its applicable collection subframe, and each mapping defines a bin width for its bins so that its bin map covers a maximum detection range for the depth-image frame. A range to an object in the pixel's field of view (within the maximum detection range) can be resolved according to a combination of peak bin positions in the histogram data with respect to the different collection subframes.

16 Claims, 18 Drawing Sheets

Notes:

Total Bins = 10
Range = 20 ns
Pulse Width = 1 ns

Frame Phase 1:
- Bin Width = 1ns

Frame Phase 2:
- Bin Width = 1.5ns
- Bin Offset = 9

| Time (ns) (250) | Mapped Bin (for Bin Map 1 during Subframe 1) (260) | Mapped Bin (for Bin Map 2 during Subframe 2) (270) | Conclusion (280) |
|---|---|---|---|
| 0 | | | |
| 0.5 | Bin 1 | Bin 9 | Signals at B1,B9 map to 0-1ns |
| 1 | Bin 1 | Bin 9 | |
| 1.5 | Bin 2 | Bin 9 | Signals at B2,B9 map to 1-1.5ns |
| 2 | Bin 2 | Bin 10 | Signals at B2,B10 map to 1.5-2ns |
| 2.5 | Bin 3 | Bin 10 | Signals at B3,B10 map to 2-3ns |
| 3 | Bin 3 | Bin 10 | |
| 3.5 | Bin 4 | Bin 1 | Signals at B4,B1 map to 3-4ns |
| 4 | Bin 4 | Bin 1 | |
| 4.5 | Bin 5 | Bin 1 | Signals at B5,B1 map to 4-4.5ns |
| 5 | Bin 5 | Bin 2 | Signals at B5,B2 map to 4.5-5ns |
| 5.5 | Bin 6 | Bin 2 | Signals at B6,B2 map to 5-6ns |
| 6 | Bin 6 | Bin 2 | |
| 6.5 | Bin 7 | Bin 3 | Signals at B7,B3 map to 6-7ns |
| 7 | Bin 7 | Bin 3 | |
| 7.5 | Bin 8 | Bin 3 | Signals at B8,B3 map to 7-7.5ns |
| 8 | Bin 8 | Bin 4 | Signals at B8,B4 map to 7.5-8ns |
| 8.5 | Bin 9 | Bin 4 | Signals at B9,B4 map to 8-9ns |
| 9 | Bin 9 | Bin 4 | |
| 9.5 | Bin 10 | Bin 5 | Signals at B10,B5 map to 9-10ns |
| 10 | Bin 10 | Bin 5 | |
| 10.5 | Bin 1 | Bin 5 | Signals at B1,B5 map to 10-10.5ns |
| 11 | Bin 1 | Bin 6 | Signals at B1,B6 map to 10.5-11ns |
| 11.5 | Bin 2 | Bin 6 | Signals at B2,B6 map to 11-12ns |
| 12 | Bin 2 | Bin 6 | |
| 12.5 | Bin 3 | Bin 7 | Signals at B3,B7 map to 12-13ns |
| 13 | Bin 3 | Bin 7 | |
| 13.5 | Bin 4 | Bin 7 | Signals at B4,B7 map to 13-13.5ns |
| 14 | Bin 4 | Bin 8 | Signals at B4,B8 map to 13.5-14ns |
| 14.5 | Bin 5 | Bin 8 | Signals at B5,B8 map to 14-15ns |
| 15 | Bin 5 | Bin 8 | |
| 15.5 | Bin 6 | Bin 9 | Signals at B6,B9 map to 15-16ns |
| 16 | Bin 6 | Bin 9 | |
| 16.5 | Bin 7 | Bin 9 | Signals at B7,B9 map to 16-16.5ns |
| 17 | Bin 7 | Bin 10 | Signals at B7,B10 map to 16.5-17ns |
| 17.5 | Bin 8 | Bin 10 | Signals at B8,B10 map to 17-18ns |
| 18 | Bin 8 | Bin 10 | |
| 18.5 | Bin 9 | Bin 1 | Signals at B9,B1 map to 18-19ns |
| 19 | Bin 9 | Bin 1 | |
| 19.5 | Bin 10 | Bin 1 | Signals at B10,B1 map to 19-19.5ns |
| 20 | Bin 10 | Bin 2 | Signals at B10,B2 map to 19.5-20ns |

Figure 2D

| Time | First pass bin | Second pass bin | OK? (3 bin separation) |
|---|---|---|---|
| 0 | 0 | 48 | TRUE |
| 1 | 1 | 48 | TRUE |
| 2 | 2 | 49 | TRUE |
| 3 | 3 | 50 | TRUE |
| 4 | 4 | 51 | TRUE |
| 5 | 5 | 52 | TRUE |
| 6 | 6 | 53 | TRUE |
| 7 | 7 | 54 | TRUE |
| 8 | 8 | 55 | TRUE |
| 9 | 9 | 56 | TRUE |
| 10 | 10 | 57 | TRUE |
| 11 | 11 | 57 | TRUE |
| 12 | 12 | 58 | TRUE |
| 13 | 13 | 59 | TRUE |
| 14 | 14 | 60 | TRUE |
| 15 | 15 | 61 | TRUE |
| 16 | 16 | 62 | TRUE |
| 17 | 17 | 63 | TRUE |
| 18 | 18 | 64 | TRUE |
| 19 | 19 | 65 | TRUE |
| 20 | 20 | 66 | TRUE |
| 21 | 21 | 66 | TRUE |
| 22 | 22 | 67 | TRUE |
| 23 | 23 | 68 | TRUE |
| 24 | 24 | 69 | TRUE |
| 25 | 25 | 70 | TRUE |
| 26 | 26 | 71 | TRUE |

SYSTEMS AND METHODS FOR MEMORY-EFFICIENT PIXEL HISTOGRAMMING

CROSS-REFERENCE AND PRIORITY CLAIM TO RELATED PATENT APPLICATIONS

This patent application is a continuation of PCT patent application PCT/US22/52775 designating the United States, filed Dec. 14, 2022, and entitled "Systems and Methods for Memory-Efficient Pixel Histogramming", which claims priority to (1) U.S. provisional patent application Ser. No. 63/291,387, filed Dec. 18, 2021, and entitled "Methods and Systems for Memory Efficient In-Pixel Histogramming", and (2) U.S. provisional patent application Ser. No. 63/304,603, filed Jan. 29, 2022, and entitled "Systems and Methods for Memory Efficient In-Pixel Histogramming", the entire disclosures of each of which are incorporated herein by reference.

This patent application also claims priority to (1) U.S. provisional patent application Ser. No. 63/291,387, filed Dec. 18, 2021, and entitled "Methods and Systems for Memory Efficient In-Pixel Histogramming", and (2) U.S. provisional patent application Ser. No. 63/304,603, filed Jan. 29, 2022, and entitled "Systems and Methods for Memory Efficient In-Pixel Histogramming", the entire disclosures of each of which are incorporated herein by reference.

INTRODUCTION

There are many imaging systems where it is desirable to use photodetectors that are capable of resolving times of photon absorption such as single photon avalanche diodes (SPADs) to support time-of-flight applications such as range detection. Flash lidar systems are an example of such spatially-resolving time-of-flight measurement systems.

However, it should be understood that other types of measurement systems would benefit from the use of SPADs as time-resolving photodetectors (e.g., fluorescence lifetime imagers (FLIMs), time domain, near infrared spectroscopy (TD-NIRS) imagers, acousto-optical imagers, time-of-flight positron emission tomography (TOF-PET) imagers, etc.) With such systems, a photodetector array comprises an array of pixels, where each pixel includes one or more SPADs that (1) provides photon detection and (2) generates an electrical signal which is temporally correlated to the arrival time of one or more photons. With a SPAD, the absorption of a single incident photon is designed to quickly produce an avalanche signal. Because the avalanche charge generated by the SPAD's breakdown grows so quickly in response to the photon absorption event, SPADs can facilitate very precise information on the time of arrival of incident photons. In a time-of-flight imaging system where a light source such as a laser is used to illuminate a scene with a number of laser pulses per depth-image frame, the timing of the avalanches generated in the SPAD in response to reflections of the laser pulses from a target will be temporally correlated with the emission times of the laser pulses. Electrical circuits can be used to generate histogram data from these avalanche times, and these histograms can be used to calculate the time of flight of photons from a lidar system's emitter to a target and back, and thereby the range of the target from the lidar system. The angular position of the target with respect to the lidar systems can be determined by various means, including the coordinates of the detecting pixels in a focal plane SPAD-pixel array.

The SPADs in a photodetector array can thus serve as the detector elements for each pixel of the photodetector array. In operation, histograms may be generated for each pixel or groups of pixels of the photodetector array, where each histogram represents time-of-arrival information for photons detected by the SPAD of one or more targets in the pixel's field of view.

It is desirable to store this time-of-arrival histogram data inside the pixel—either on the same die as the SPAD array or in a readout die which is interconnected (e.g., vertically interconnected) to the SPAD array die in order to save power and/or reduce the area needed for signaling. However, it is also desirable to keep the pixels as small as possible in order to reduce size (which not only reduces the cost of the photodetector array; but the reduced size also opens up the feasibility of using lower cost imaging optics by the system). This creates tension because the memory cells required to store a histogram may occupy a significant percentage of pixel real estate, which means that the presence of in-pixel memory to support histogram generation translates into relatively large pixel sizes.

During operation of the pixel, histogram collection occurs as the imaging system fires light pulses and photons impact the SPAD (some of which will constitute returns from an object illuminated by the light pulses). The histogram comprises a plurality of time bins, where each bin corresponds to a collection time window. Thus, Bin 1 can collect counts of SPAD detections that occur over Collection Time Window 1, Bin 2 can collect counts of SPAD detections that occur over Collection Time Window 2, and so on through Bin n which can collect counts of SPAD detections that occur over Collection Time Window n. These collection time windows can be referenced to an event or events, such as the trigger time or times of firing one or more light pulses. The size of each bin's collection time window is referred to as the bin width. Thus, the bin width for a given bin represents the duration of the collection time window covered by the given bin.

FIG. 1A shows an example of a conventional approach for mapping histogram bins to time for a pixel (see plot 100 in FIG. 1A). It should be understood that while FIG. 1A shows plot 100 as a continuous line that relates bin number to time, it should be understood that each bin represents a discrete time window (e.g., Bin 50 corresponds to the time window of 49-50 ns, Bin 100 corresponds to the time window of 99-100 ns, Bin 150 corresponds to the time window of 149-150 ns, and Bin 200 corresponds to the time window of 199-200 ns) Each of these discrete time windows can be referred to as a range point. Thus, in actuality, the bin map plot of FIG. 1A (and the other figures disclosed herein which show plots of bins to time) would exhibit more of an appearance of discrete steps at each bin position, but a continuous line is shown by FIG. 1A and other figures for ease of illustration.

In the example of FIG. 1A, the pixel includes 200 bins, each with a bin width of 1 ns. This means that the histogramming supported by FIG. 1A covers a total collection time window of 200 ns, which in turn may define the unambiguous maximum detection range for the pixel. This 200 ns means that, for a lidar system imaging a target at the farthest unambiguous range, light will travel 100 ns from the lidar system to the target, whereupon the light reflects from the object and returns to the pixel over the next 100 ns. This 100 ns time of flight for light to the object translates to around 30 m of distance to the object when factoring in the speed of light. In other words, if x is the distance to the target and c is the speed of light, then the time of flight in this case would be t=2x/c. Accordingly, for the example of FIG. 1A, the pixel supports an unambiguous maximum detection range of up to around 30 m. For ease of reference, the maximum detection range can also be referred to as the detection range for the system (or pixel).

A simplified example of a conventional collection process for a depth-image frame (also known as a 3D-image frame or a 3D-frame) with respect to a subject pixel is shown by FIG. 1B. At the start of frame acquisition (see 150), histogram memory is reset (see 152), and the light pulse emission cycles begin. With each light pulse emission 154, a time measurement is started (see 156), and the SPAD for the subject pixel is charged (see 158). After the light pulse emission at 154, the SPAD begins waiting for an avalanche at 160. If an avalanche signal is detected by the SPAD within the acquisition gate for detecting a return from the light pulse emission (see 162), then the histogram bin corresponding to the time of avalanche signal detection (as referenced to the start of time measurement) has its count updated at 164 (see FIG. 1A for an example mapping of time to bins for the histogramming process of FIG. 1B). The process can start when an optical emitter begins transmitting light pulses into a field of view for an optical receiver (where the optical receiver includes a photodetector array that comprises SPAD-based pixels). If the subject pixel's SPAD detects an incident photon, say, 50 ns after a light pulse is fired, this will result in Bin 50 of the histogram being incremented. The next laser pulse cycle can then begin after the end of the acquisition gate for the current laser pulse cycle (see 166). If no avalanche signal is detected during the acquisition gate (see 168), the SPAD is disarmed at 170. This process repeats for a number of additional light pulse emissions (where the time measurements are reset for each laser pulse emission) until an end of frame is reached at 172. At the end of the collection process for the depth-image frame, the pixel memory will hold histogram data that comprises count data in each bin that represents a count of how many photons were detected by the subject pixel at the time windows corresponding to each bin. This time-referenced histogram data can then be read out from memory at 174, processed to detect histogram peaks at 176, and the detected peaks are translated (via calculations 178 relating to background signal and signal peak positions) into a range to an object within the pixel's field of view based on which time of arrival window is associated with the peak bin in the histogram data (presuming the object is within the detection range of the pixel). If no peak is detected at 176, then the pixel memory can record a null output for the subject pixel (see 180). The information determined at 178 or 180 can be output or stored as the pixel output (see 182), whereupon the frame acquisition ends (see 184).

The accuracy of the range measurement may be affected by a number of system parameters. In typical cases, a received signal photon may have been emitted at any time during the laser pulse. Thus, the duration of the laser pulse may reduce the resolution of the time-of-flight measurement. SPADs exhibit jitter, i.e., an uncertainty between the actual time of absorption of a photon and the time of the sensing of the photogenerated avalanche. This jitter also adds to the error in measuring the time of flight. The time measurement circuit, such as a Time-to-Digital-Converter (TDC), or any other electrical timing circuit will also have a measurement or clocking error which will add to the overall error in measuring the time of flight. Finally, once an event is allocated into one of the histogram's memory bins, its precise value is lost and the resolution of the measurement is limited to the time width of the bin.

If we assume that the subject pixel is looking at an object 50 ns away (or roughly 15 meters away), this means that it will take 100 ns for a light pulse return from the object to reach the pixel. Accordingly, the histogram generated by the pixel as a result of the collection process using the bin mapping plot of FIG. 1A (where the histogram plots bin counts as a function of bin number) should exhibit a peak at around Bin 100. It should be understood that not all of the SPAD-based detections by the pixel will be attributable to returns of the light pulses that are reflected by the object that the pixel is looking at. For example, ambient light (e.g., sunlight, nearby artificial lights, etc.) can also be the source of photons that trigger bin counts by the pixel. However, sunlight and other illumination sources would be uncorrelated to the time of emission of the light pulses and would have a uniform probability of arriving at times belonging to any of the histogram bins, whereas the time-correlated echoes would arrive in or close to bin 50. Thus, after numerous light pulse cycles for a given frame acquisition, we would expect to see more counts around bin 50, whereas other bins would exhibit a background level with a noise associated with it (the noise typically being equal to the square root of the background number of counts per bin). The term "peak bin" as used herein will refer to a histogram bin that contains the highest number of counts of the return signal from the light pulse. The identification of the peak bin thus helps identify the return signal peak (which can be referred to as the "signal peak") and then map this signal peak to a time of arrival using techniques discussed below. It should be understood that in some circumstances, the bin with the largest count may not necessarily be the peak bin as there may be circumstances where a given bin is saturated with noise and interfering light that produces a large bin count. Accordingly, peak detection, envelope detection and time correlation techniques can be applied to a given histogram to identify which of the bins should be characterized as peak bins.

It should be understood that this collection and histogramming process would be repeated for each pixel of the photodetector array so that the depth-image frame can include range data for objects in the field of view for each pixel. As explained in greater detail below, this results in relatively large memory requirements and data processing capabilities for an optical receiver that includes a SPAD-based photodetector array.

With conventional histogram implementations for imaging systems, the temporal resolution (and therefore the range measurement resolution) of the pixel is determined by the bin width for the bins of the histogram, together with several other system parameters, as outlined above. As an example, to achieve 10 cm range resolution, and assuming that the laser pulse width, jitter and timing measurement are finer than the bin width, the required temporal resolution (bin width) would be:

$$\text{Bin Width} = \frac{2 \times 0.1 \text{ meters}}{3 \times 10^8 \text{ meters/second}} = 670 \text{ picoseconds}$$

Furthermore, in order to range targets from 0 meters to 100 meters (i.e., where the detection range is 100 m) at 10 cm of resolution, the pixel would need to support 1000 bins. Moreover, the memory depth for each bin would need to accommodate a sufficiently high photon count per bin to reduce the risk of saturation. For example, for highly-reflective objects, each laser pulse may result in a photon detection event. As an example, if one wanted to prevent saturation below photon counts of 3,000, then each bin would need to have a depth of 12 bits (as defined by log 2(4,096)). The use of 1000 12-bit bins translates to 12 kbits of memory for the memory cells that are to be used to store the subject pixel's histogram.

If we assume that there is a space requirement of 0.242 $\mu m^2$ per memory cell (and there is 80% area utilization of memory for the pixel), this means that the area needed to accommodate the pixel would be roughly:

$$\text{Pixel Area} = \frac{0.242 \ \mu m^2 \text{ per bit} \times 12{,}000 \text{ bits}}{0.8} = 3{,}630 \ \mu m^2$$

This pixel area of 3,630 $\mu m^2$ could be translated to dimensions of 60.25 $\mu m \times 60.25$ $\mu m$. However, in order to minimize silicon area and cost, it is often desirable to make the pixel area much smaller (such as 25 $\mu m^2$, 50 $\mu m^2$, 100 $\mu m^2$, or 250 $\mu m^2$ as extreme examples).

However, this represents a significant technical challenge in the art because new innovative technical solutions are needed that provide an ability to shrink pixel size while not losing range or range resolution. In other words, there is a need for technical innovation with respect to pixel design that allows for the maintenance of high temporal resolution for a sufficiently long set of ranges while still achieving a suitably small area on the chip.

One option for reducing pixel size is to shrink the amount of memory needed for histogramming by using larger bin widths for the histogram. A priori information regarding the shape of the histogram can then be used to interpolate the position of the peak. FIG. 1C shows an example with two histogram plots 102 and 104. Each histogram includes 200 bins, but the bins of histogram 102 have a larger bin width than the bins of histogram 104. When these histograms are generated for a pixel looking at the same object at the same range, a peak for histogram 102 can be seen around Bin 165, and a peak for histogram 104 can be seen at around Bin 155. Given the different bin widths for histograms 102 and 104, it should be understood that Bin 165 from histogram 102 and Bin 155 from histogram 104 would map to approximately the same time delay from the reference time.

This solution of increasing bin width to shrink memory requirements for the pixel has several limitations. FIG. 1D shows a result of numerical simulation of the impact of increased bin width on range imprecision (noise). In short, as we increase bin width, the pixel collects more noise which detracts from range precision. For a Poissonian noise source, the noise on the histogram counts will scale as the square root of the bin width, and therefore as we increase the bin width we will decrease the precision of peak detection (and therefore range) estimation. This is shown by plot 106 of FIG. 1D (where the standard deviation on the vertical axis corresponds to range imprecision).

Moreover, as bin width is increased, there will also be a need to increase the bit depth in each bin as the extra bin width will typically mean each bin will accumulate a larger count for each depth-image frame. For example, by halving the number of bins (doubling the bin width), we may need to add an additional bit for each bin so the bin can double the maximum photon count that it supports.

Another option for reducing pixel size is simply to reduce the number of bins while keeping the same bin width. However, this approach reduces the range that is detectable by the pixel. FIG. 1E shows an example of this approach. By way of comparison to FIG. 1A (where there are 200 bins covering 200 ns of range with a 1 ns bin width), FIG. 1E shows what happens when we halve the number of bins while keeping the same bin width. With this approach, plot 100 shows the mapping of bins to time for the first 100 ns of range. If we simply wrap around these bins for the next 100 ns of range (from 101 ns to 200 ns, as shown by plot 112 and as indicated by the horizontal line 120 at the 100 ns mark), it should be appreciated that the system loses the ability to use peak detection to correctly resolve range. That is, an object located at a range corresponding to the 50 ns time mark would produce a peak in Bin 50 of the histogram; but so would an object located at a range corresponding to the 150 ns time mark. Accordingly, if plots 110 and 112 were used to map bins to times as shown by FIG. 1E, the system would be unable to resolve whether a given peak on the resulting histogram corresponds to an object at a range corresponding to the times indicated by plot 110 or by plot 112 or by a combination of returns from both. This indicates that reducing the number of bins for a system may create the undesirable effect of range ambiguity.

However, as a counter-intuitive solution to the conventional tradeoff of pixel size versus range and range resolution, the inventors disclose histogramming techniques that are highly memory-efficient so less memory is needed by the pixel to support object detections up to a desired range with a desired resolution and at a desired acquisition time, which means that pixel size can be reduced without significant performance losses.

To accomplish this, the inventors disclose that the frame collection time for a pixel can be divided into multiple collection subframes, such as a first collection subframe and a second collection subframe. Each of these subframes can encompass multiple light pulse cycles (e.g., 100 light pulse shots, 500 light pulse shots, 1,000 light pulse shots, etc.), although each collection subframe need not encompass the same number of light pulse cycles. The same bins in memory may be shared by the multiple collection subframes. A histogramming operation can then use different mappings of the bins to times for the different collection subframes when generating histogram data for the different collection subframes. For example, a first bin map can be used for histogramming during the first collection subframe, and a second bin map can be used for histogramming during the second collection subframe, where these bin maps associate the bins with time in a manner where a given bin will be mapped to different time windows for the first and second collection subframes. With this approach, when the pixel is looking at an object that is located within the detection range of the pixel, a range to the object is resolvable based on the histogram data according to a combination of bin positions for signal peaks in the histogram data with respect to the different collection subframes.

In an example embodiment, the first and second bin maps employ different bin widths, and at least one of the bin maps will have bins that map to a plurality of different time windows (e.g., where Bin i maps to both time window X and time window Y).

In another example embodiment, the detection range, the bin widths, and the bin-to-time mappings are chosen to ensure that each desired range point over the detection range supported by the system maps to a unique ordered combination of bins according to the first and second bin maps. A bin offset as discussed below can be used to facilitate this uniqueness.

Further still, in another example embodiment, the pulse width for the light pulses, the detection range, the bin widths, and the bin-to-time mappings are chosen to ensure that each range point over the detection range supported by the system maps to a unique unordered combination of bins according to the first and second bin maps with a minimum bin separation between the bins of the ordered combination. A bin offset as discussed below can be used to facilitate this uniqueness. This minimum bin separation can account for the longest expected signal histogram bin-width in order to avoid an overlap between the histograms from the first and second subframes. In this fashion, the system can perform a single readout of histogram data that covers both the first and second collection subframes so that this histogram data includes a combination of signal peak positions that resolves the range to the object.

With these approaches, example embodiments described herein are capable of leveraging the memory efficiency of the improved histogramming operation to shrink the memory requirements for a given pixel to image at a desired detection range with a desired resolution and/or improve data throughput by reducing the number of bits which need to be readout per frame relative to conventional histogramming approaches in the art.

These and other features and advantages of the invention will be described in greater detail below.

BRIEF DESCRIPTION OF THE DRAWINGS

FIG. 2D shows a table that identifies how an example set of bin maps correspond to range determinations, where bin offsetting and different bin widths are employed for the first and second collection subframes according to the first and second bin maps.

FIG. 9 shows an example table with a partial list of peak bin combinations for each range value supported by an example system.

DETAILED DESCRIPTION OF EXAMPLE EMBODIMENTS

As noted above, to resolve the dilemma of trading pixel memory size for pixel detection range and/or range resolution as discussed above with reference to FIGS. 1A-1E, the inventors disclose a memory-efficient and acquisition time-efficient histogramming technique where the collection time for a depth-image frame is divided into multiple subframes—such as a first collection subframe and a second collection subframe for the subject depth-image frame. Relative to a conventional approach for histogramming, the inventors disclose that the pixel memory can employ only a fraction of the number of bins (e.g., half or one third or three-eighths the number of bins) without suffering any significant consequences in terms of detection range, range resolution, or acquisition time. With this inventive approach, different mappings of time to bins can be employed for the at least first and second collection subframes of the depth-image frame. In this fashion, the histogram data generated for each collection subframe can be processed to resolve range to an object in the pixel's field of view based on a combination of peak bin positions exhibited by the histogram data.

Figure 2A:
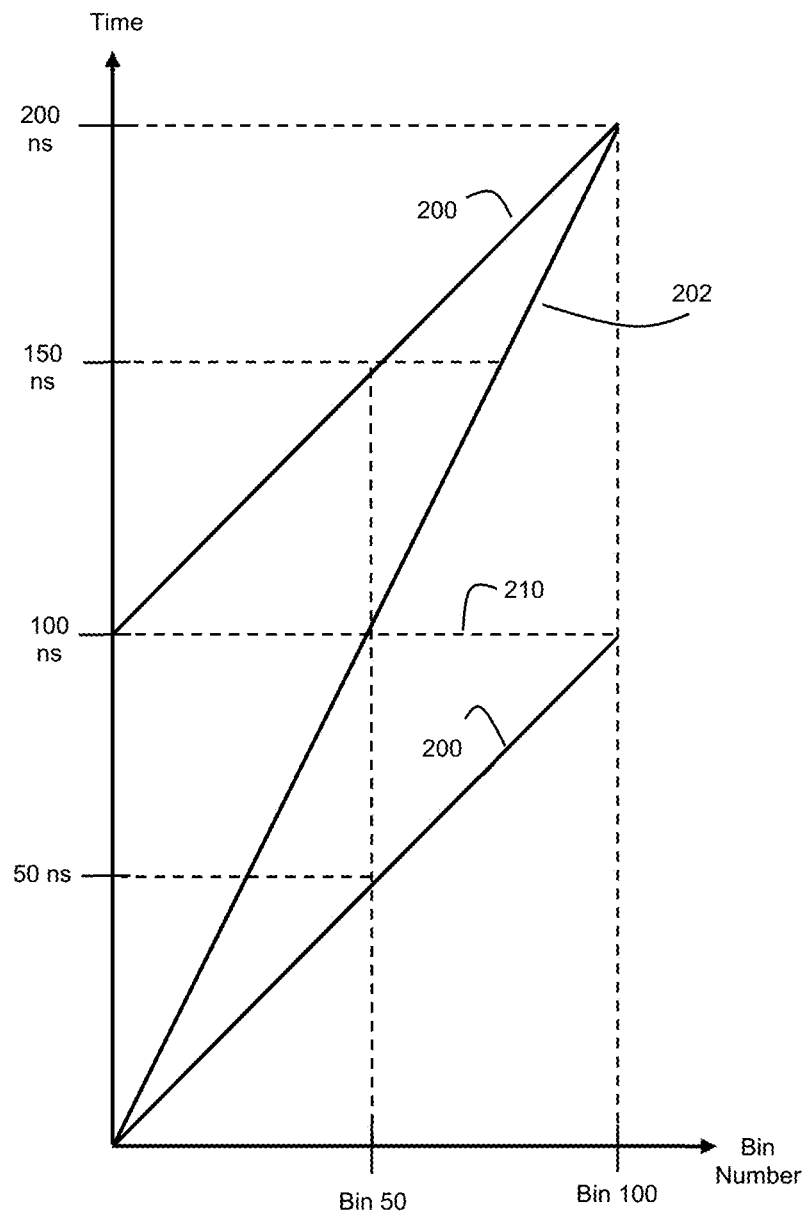
FIG. 2A shows an example set of bin maps to use during first and second collection subframes according to an example embodiment where the first and second bin maps exhibit different bin widths.

FIG. 2A shows an example where a bin map 200 is used when accumulating histogram data during the first collection subframe and a bin map 202 is used when accumulating histogram data during the second collection subframe. In this example, the difference between bin map 200 and bin map 202 is in the respective bin widths for each map. Namely, bin map 200 uses 100 bins to cover 200 ns of range with a 1 ns bin width, and bin map 202 uses 100 bins to cover 200 ns of range with a 2 ns bin width (although it should be understood that different values for the total number of bins, bin widths, and detection range could be employed if desired by a practitioner). It can be seen from FIG. 2A that bin map 200 wraps around after 100 ns (as indicated by horizontal line 210). In this fashion, each bin position for bin map 200 maps to two distinct time windows (e.g., Bin 50 maps to the time window of 49-50 ns and the time window of 149-150 ns). Accordingly, a histogram generated using only bin map 200 during the first collection subframe will not be able to resolve range to the object to any reasonable degree since a histogram peak bin at, say, Bin 50, ambiguously indicates a time of arrival corresponding to either 49-50 ns or 149-150 ns.

However, by virtue of its different bin width, bin map 202 has a different mapping of bins to time than bin map 200. As such, during the second collection subframe while the pixel is looking at the object, the histogram that is generated using bin map 202 can be used to resolve which of the range possibilities exhibited by the histogram from the first collection subframe is correct. For this example, we will assume an object is located at a range that will produce a time of arrival at 50 ns. The histogram generated using bin map 200 as a result of the first collection subframe will exhibit a peak bin in Bin 50, where Bin 50 corresponds to a time of arrival of either 50 ns or 150 ns. Then, the histogram generated using bin map 202 as a result of the second collection subframe will exhibit a peak bin in Bin 25, which allows the system to correctly resolve that the range to the object should be based on the 50 ns time of arrival (rather than the 150 ns time of arrival).

It should be understood that practitioners may find it desirable to employ a smaller difference in bin widths between bin maps 200 and 202 than shown by FIG. 2A (where the 2× difference in bin width in the example of FIG. 2A was selected for ease of explanation). For example, by using too large of a bin width for bin map 202, the histograms generated via bin map 202 will contain significantly less timing information than the histograms generated via bin map 200. For example, if the pulse width is 1.5 ns, then we would collect 2 or 3 bins of information in the histogram data for the subframe that uses the 1 ns bin width, but we would only collect 1 or 2 bins of information in the histogram data for the subframe that uses the 2 ns bin width. This means that while the second bin map 202 will help with range disambiguation, the second bin map 202 will not really help with respect to interpolating a more precise signal peak position within a given bin width. A more efficient approach is for the two bin widths to be very close to each other (e.g., a 1 ns bin width for bin map 200 and a 1.1 ns bin width for bin map 202) so that the histogram data for both subframes provides high resolution temporal information. In this regard, it is desirable to find out where inside a bin that the signal peak is located. For example, if we use a 1.5 ns pulse width and a 1 ns bin, we will get a highest fidelity peak interpolation if the signal peak falls right at the center of the middle bin (where left bin has 0.25 ns of the pulse, the middle bin at 1 ns of the pulse, and the right bin has 0.25 ns of the pulse). In this scenario, the histogram data would provide 3 bins of information to work with to resolve the precise signal peak position. But, in continuing with this example, we will get a worst case for fidelity peak interpolation if the 1 ns of the pulse falls in the middle bin and the remaining 0.5 ns of the pulse falls in the right bin because the histogram data would only provide 2 bins of information to work with. By using too large of a bin width, the system will increase the likelihood of poor alignments of pulse returns to bins and the likelihood of having fewer bins of information will increase. By contrast, with small differences in bin width between the different bin maps, practitioners can intentionally create aliasing between different subframes that will help improve the fidelity of peak interpolation relative to larger differences in bin width between the different bin maps.

Accordingly, for some example embodiments, practitioners may find it desirable for the bin widths to be chosen so that there is only a difference in bin width on the order of 0.5%-15% as between the different subframes. For other example embodiments, practitioners may find it desirable for the bin widths to be chosen so there is only a difference in bin width on the order of 0.5%-50%; while for other example embodiment, practitioners may find it suitable to use larger differences in bin widths.

It can be seen from FIG. 2A that there is some overlap in the assignments of time to bins as between bin maps 200 and 202. In particular, Bin 1 maps to the time window of 0-1 ns according to both bin maps 200 and 202, and Bin 100 maps to the time window of 199-200 ns according to both bin maps 200 and 202. These overlaps can extend to additional bin widths if the pulse width for the light pulses used during the collection subframes is sufficiently long. For example, a pulse width of 1 ns can register peak bins across two bins. Similarly, a pulse width of 2 ns can register peak bins across three bins, and so on for other pulse widths. This means that additional ambiguity might arise at, for example, Bins 2 and 199 of FIG. 2A as between bin maps 200 and 202. To mitigate the effects of this overlap, two readouts can be performed from the pixel memory—namely, a first readout at the end of the first collection subframe to access the histogram data for the first collection subframe and a second readout at the end of the second collection subframe to access histogram data for the second collection subframe. If the object is located at a range corresponding to the 1 ns time of arrival, the first and second histograms would both exhibit a peak bin at Bin 1. Similarly, if the object is located at a range corresponding to the 200 ns time of arrival, the first and second histograms would both exhibit a peak bin at Bin 100. If the bins are not cleared after the first readout, it should also be understood that Bins 1 and 100 may need one or more extra bits of depth to avoid saturating the bin (as these bins would be accumulating signal counts (as well as other counts) during both the first and second collection subframes in these examples).

Figure 1A:
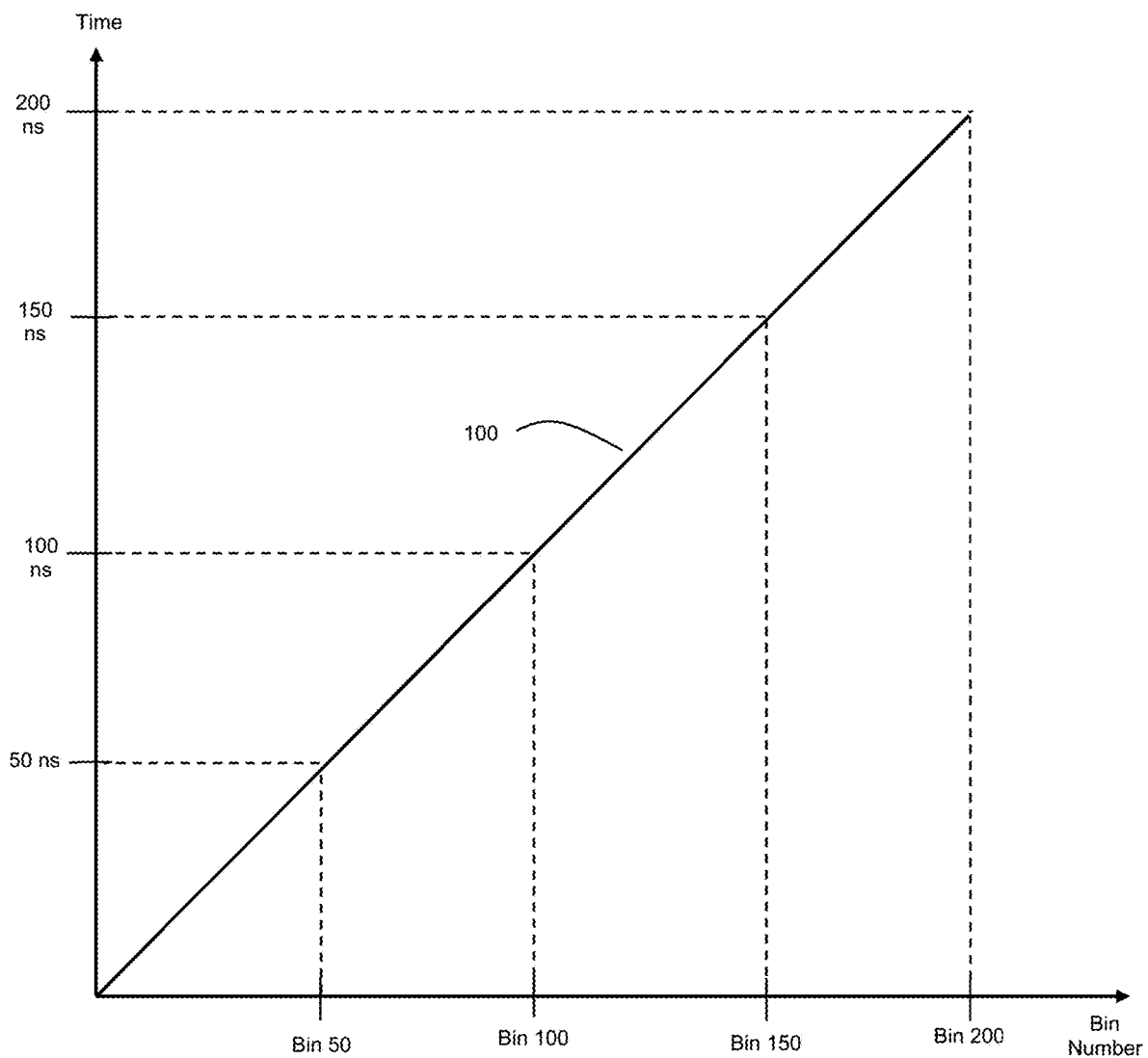
FIG. 1A shows a conventional mapping of time to bins for use when histogramming times of arrival for light detections with respect to a photodetector pixel.

Due to the need for two readouts to resolve range for the times of arrival with bin overlaps according the first and second bin maps, the histogramming approach demonstrated by FIG. 2A does suffer from shortcomings in terms of higher required data throughput, although some practitioners may find this shortcoming outweighed by the benefit of reducing the size of the pixel memory (compared to, for example, the conventional histogramming approach of FIG. 1A).

Figure 2B:
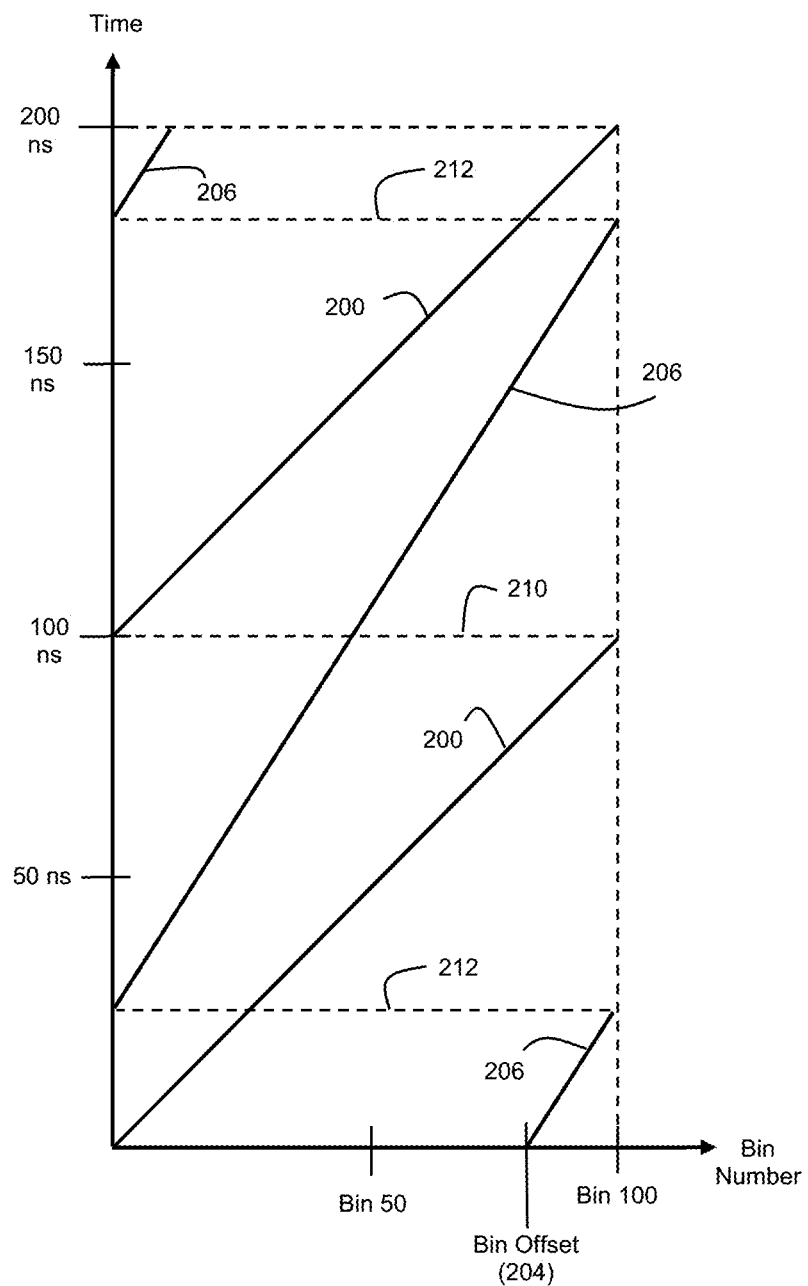
FIGS. 2B and 2C shows two example sets of bin maps to use during first and second collection subframes according to an example embodiment where (1) the first and second bin maps exhibit different bin widths and (2) a bin offset anchored to zero time is employed as between the first and second bin maps.
Figure 2C:
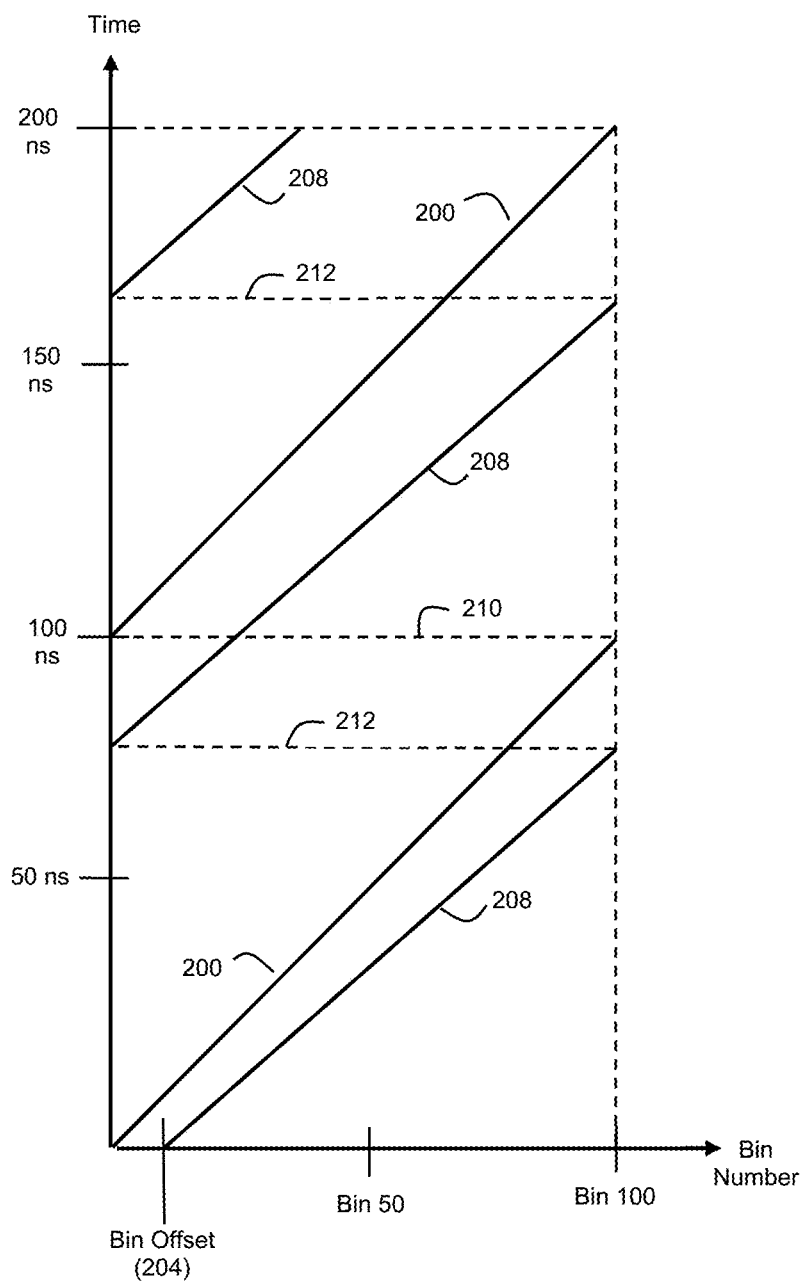

To eliminate the need for multiple readouts per depth-image frame, the inventors also disclose additional techniques for memory efficient histogramming as demonstrated by the examples of FIGS. 2B and 2C. With these examples, the bin maps for the two collection subframes also employ a bin offset 204 that anchors the initial time (time zero) for each bin map to a different bin. In doing so, the bin offset 204 can be chosen to support a single readout of the histogram data from memory per depth-image frame. However, it should be understood that the bin offset 204 can also be useful in scenario where there are multiple readouts per depth-image frame (e.g., a first readout of histogram data for the first collection subframe and a second readout of histogram data for the second collection subframe). For example, for smaller differences in bin width than that shown by FIG. 2A, there may be additional and more extensive overlaps in the assignments of time to bins as between the two bin maps. To reduce or eliminate such overlaps, the bin offset 204 can be employed to increase the bin separations for overlapping times which is helpful even if there are multiple readouts of histogram data per depth-image frame.

Accordingly, for the example of FIG. 2B, bin map 200 (for use during the first collection subframe) associates its earliest time of arrival window with Bin 1, while bin map 206 (for use during the second collection subframe) associates its earliest time of arrival with the bin corresponding to Bin Offset 204 (which is a different bin than Bin 1).

In the example of FIG. 2B, bin map 200 is the same as was shown for FIG. 2A in that it starts from Bin 1 and each bin exhibits a bin width of 1 ns. Bin map 206 shown by FIG. 2B starts from Bin Offset 204 and exhibits a bin width greater than 1 ns (as demonstrated by the steeper slope for the plot of bin map 206 relative to bin map 200). Bin map 206 for this example wraps around twice as indicated by the horizontal lines 212.

It can be seen from FIG. 2B, that each 1 ns time window on the vertical axis maps to a unique combination of different bins for bin maps 200 and 206. This means that a single readout of histogram data that combines the histograms produced during the first collection subframe (according to bin map 200) and the second collection subframe (according to bin map 206) will exhibit a pair of peak bins that resolves to a particular time window of no greater than 1 ns.

FIG. 2C shows an example where bin map 200 is used during the first collection subframe and bin map 208 is used during the second collection subframe. Bin map 200 of FIG. 2C is the same as was shown for FIGS. 2A and 2B. By contrast relative to FIG. 2B, bin map 208 of FIG. 2C starts from a different Bin Offset 204 and exhibits a bin width that is shorter than the bin width of bin map 200 (as demonstrated by the steeper slope for the plot of bin map 200 relative to bin map 208). Bin map 208 wraps around twice as indicated by the horizontal lines 212.

As with FIG. 2B, FIG. 2C shows that each time window on the vertical axis maps to a unique combination of different bins for bin maps 200 and 208. As noted above, this means that a single readout of histogram data that combines the histograms produced during the first collection subframe (according to bin map 200) and the second collection subframe (according to bin map 208) will exhibit a pair of well-separated peak bins which enables the system to calculate the peak position with approximately the same precision as that achievable by using bin map 208.

It should be understood that FIGS. 2B and 2C are just examples where bin offsetting is employed to support single histogram readout from pixel memory to resolve range to the object that the pixel is looking at (presuming the object is within the detection range of the pixel). For an example embodiment, practitioners may choose to employ different detection ranges, bin widths, and bin offsets and support single readout histogram processing per depth-image frame so long as the following two conditions are satisfied:

1) "No Overlap" Condition. For all ranges within the desired detection range and for the desired range resolution, there should not be any peak bin position overlaps for histograms generated using first and second bin maps during the first and second collection subframes respectively. As noted above, for a given set of operating parameters, the maximal bin extent of a signal histogram is known. For example, as noted above, a 1 ns pulse width can manifest as a peak across two 1 ns bins, a 2 ns pulse width can manifest as a peak across three 1 ns bins, etc. This maximal signal histogram extent can thus serve to calculate a minimum bin separation that must exist between the peak bins in the histograms for the first and second collection subframes for each range.

2) "Unique Combination of Unordered Peak Bins per Range" Condition. The combination of peak bin positions in the histograms for the first and second collection subframes must be unique for each range—regardless of whether the peak bin is attributable to the first collection subframe or the second collection subframe. Thus, if a time of arrival window for a specific range maps to a peak bin combination of Bins X and Y for the first and second collection subframes respectively, this means that no other time of arrival window for a different specific range should map to the peak bin combination of Bins X and Y, whether it be (1) Bin X for the first collection subframe and Bin Y for the second collection subframe or (2) Bin Y for the first collection subframe and Bin X for the second collection subframe). Since the single readout of histogram data will aggregate the histograms from the first and second collection subframes, it may well be the case that the order of the peak bins as between the first and second collection subframes cannot be inferred. Thus, by requiring that each range point in the detection range must map to a unique pair of peak bins regardless of order, the system can ensure the aggregated histogram can be accurately unwound to the proper range mapping.

Techniques for determining whether these conditions are satisfied for a given choice of detection range, total number of bins, bin widths, and pulse width are discussed below.

FIG. 2D shows a table with a simple example of bin mappings to time (see column 250) for a first bin map corresponding to a first collection subframe (see column 260) and a second bin map corresponding to a second collection subframe (see column 270). For this example, the detection range for the system is 20 ns, the total number of bins is 10, and the pulse width is 1 ns (which means that a minimum bin separation of 2 bins is needed to accommodate a 2-bin maximum bin space for peak bins in the histogram). The bin width for the first collection subframe is 1 ns, and the bin width for the second collection subframe is 1.5 ns. FIG. 2D also shows the Bin Offset 204 in that the earliest range point maps to Bin 1 for the first bin map and maps to Bin 9 for the second bin map. Each row of the table corresponds to a 0.5 ns window for time of arrival of a photon relative to a reference such as the firing of a light pulse during the relevant collection subframe. As shown by column 280, it can be seen that each ordered combination of peak bin positions maps to a unique time of arrival window in column 250. Moreover, the smallest bin difference for each of these unique combination is 2 bins (for the range windows corresponding to times of arrival between 16-16.5 ns (Bins 7 and 9) and times of arrival between 17.5-18 ns (Bins 8 and 10), which satisfies the requirement that the bin separation be no less than the 2-bin maximum bin space requirement for a pulse width of 1 ns.

It can also be seen from FIG. 2D that the order of peak bins (as between the first and second collection subframes) must be ascertained to uniquely resolve the range. For example, the peak bin combination of Bins 1 and 9 (for the first and second collection subframes respectively) map to a range window of 0-1 ns, while the peak bin combination of Bins 9 and 1 (for the first and second collection subframes respectively) map to a range window of 18-19 ns. Accordingly, this is an example where Condition (2) discussed above is not satisfied, in which case a practitioner may want to choose a different set of operating parameters so that both Conditions (1) and (2) would be satisfied to ensure reliable range determinations from a single readout of histogram data per depth-image frame.

However, in some circumstances, it should be understood that the order of the peak bins may still be ascertained even if there is only a single readout that aggregates the histogram data from the first and second collection subframes into a single histogram. For example, given that the second bin map has a longer bin width, it is to be expected that the peak bin arising from the second collection subframe will exhibit a larger count than the peak bin arising from the first collection subframe because the longer bin width of the second bin map means that the bins will collect more light during the second collection subframe. Accordingly, processing logic can compare the magnitudes of the two peak bins to determine which is larger and then infer that the larger peak bin corresponds to the collection subframe that was made using a bin map with the longer bin width. To more reliably ensure that this condition holds true, the system can employ a sufficient number of light pulse cycles during the collection subframe corresponding to the longer bin width so that it will be highly reliable that the larger peak bin corresponds to the collection subframe with the longer bin width (for the example of FIG. 2D, this can be mean that the same number of light pulse cycles are used for the two collection subframes or a greater number of light pulse cycles are used for the second collection subframe relative to the first collection subframe). In situations where it is possible to infer the order of the peak bins based on the magnitude of the peaks, then Condition (2) discussed above can be relaxed so that all ordered peak bin pairs are unique per range point. However, it should be understood that this ability to infer the order of the peak bins based on the magnitude of the peak bins is not always possible. Accordingly, practitioners may choose to require that Condition (2) be met to support accurate range determines when using a single readout of histogram data in a wide array of circumstances.

Figure 2E:
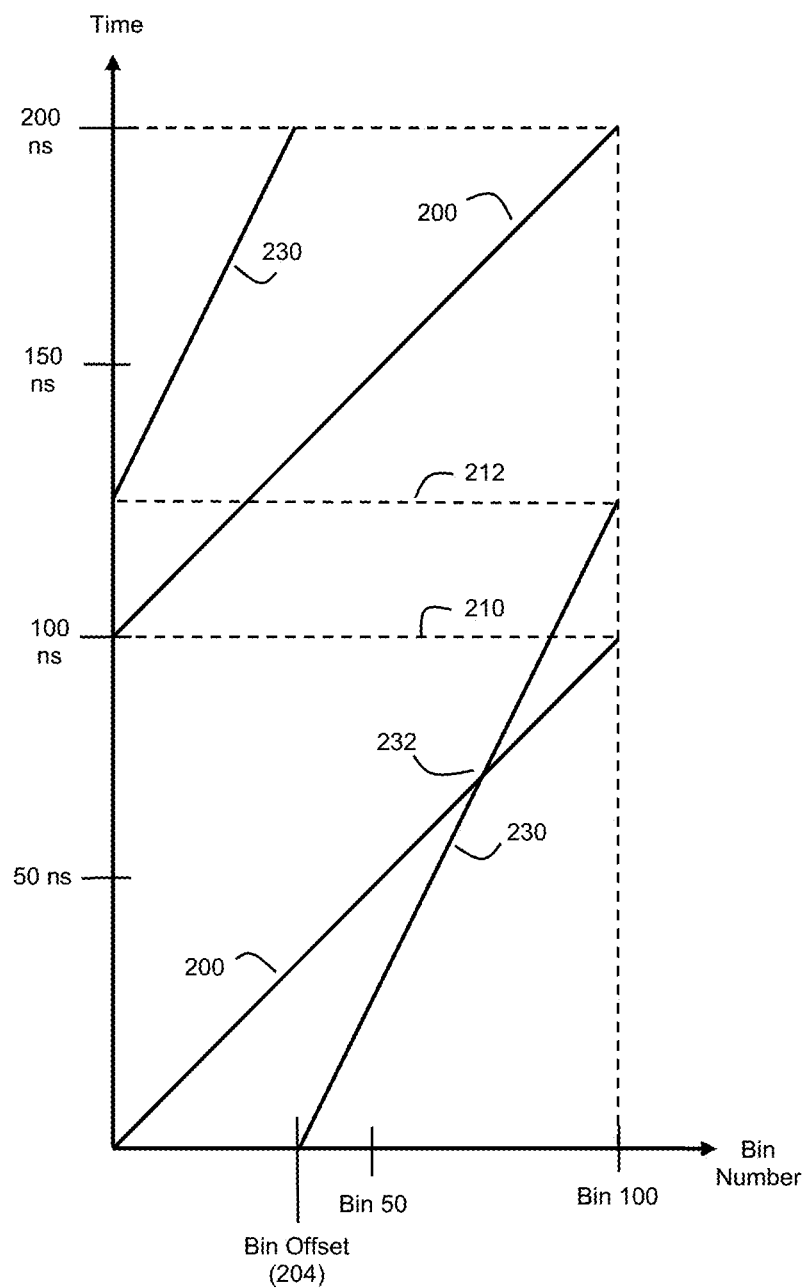
FIG. 2E shows an example where bin offsetting as between the first and second bin maps does not prevent a scenario where the same bin will map to the same time for the first and second bin maps.

FIG. 2E shows how the choice of value for Bin Offset 204 can impact whether the "no overlap" condition (Condition (1)) discussed above is satisfied. FIG. 2E shows a bin map 200 that corresponds to bin map 200 from FIGS. 2A-2C. FIG. 2E also shows a bin map 230, where its Bin Offset 204 causes an overlap to occur at the time-to-bin mapping which corresponds to intersection 232 between bin map 200 and bin map 230. Thus, it should be understood that the "no overlap" condition discussed above can be achieved by selecting a value for Bin Offset 204 that ensures no intersections occur between the first and second bin maps. For the example of FIG. 2E, this can be achieved by shifting the Bin Offset 204 further to the right so that no intersection occurs between bin maps 200 and 230 at any point along the supported detection range of 200 ns.

Figure 3A:
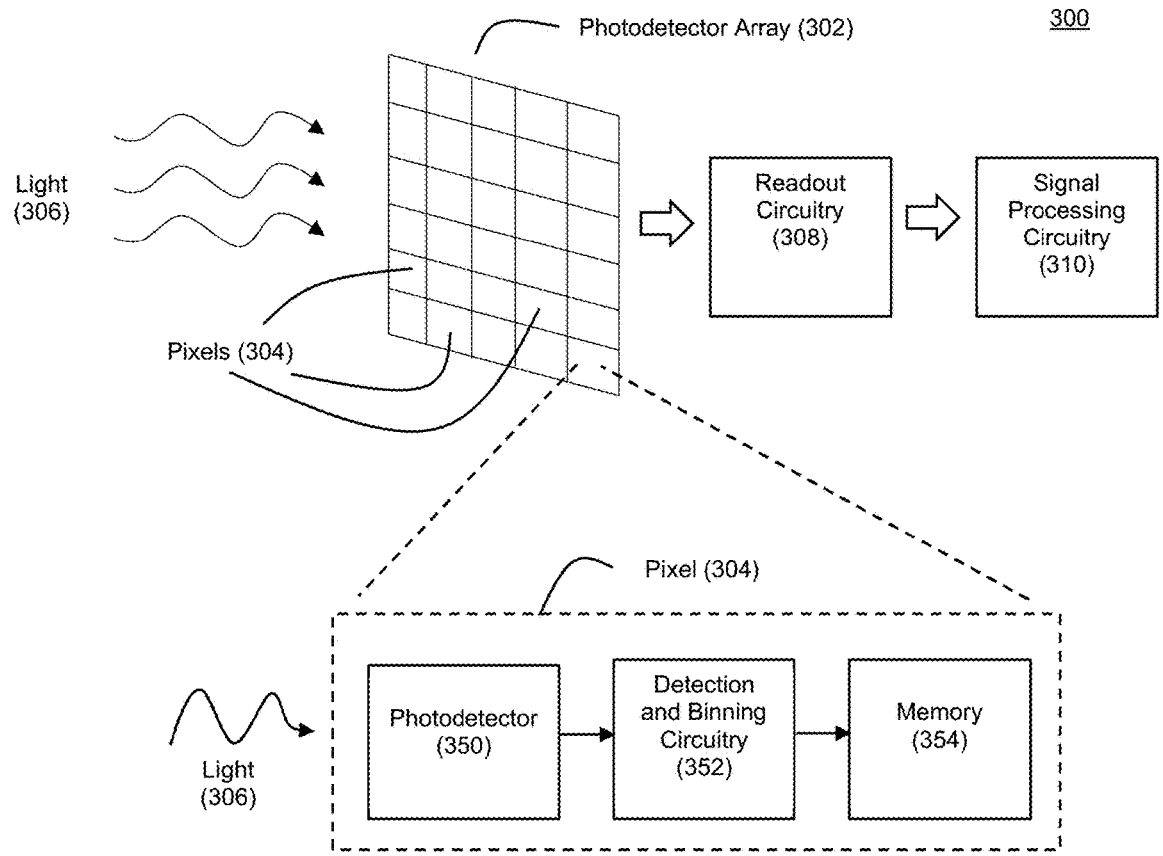
FIG. 3A depicts an example pixel architecture for use in an optical receiver according to an example embodiment.

FIG. 3A depicts an example pixel data flow for use in an optical receiver 300 according to an example embodiment. The optical receiver 300 comprises a photodetector array 302 that senses incident light 306, where the photodetector array comprises a plurality of pixels 304. Each pixel 304 comprises (1) a photodetector 350 that triggers a signal in response to the arrival of a photon within the incident light 306, (2) detection and binning circuitry 352, and (3) memory 354. In an example embodiment, the photodetector 350 is a SPAD that produces an avalanche signal in response to photon absorption, and the discussions below will be made with respect to example embodiments where a SPAD serves as the photodetector 350. However, it should be understood that photodetector 350 may take forms other than SPADs. For example, for other example embodiments, the photodetector 350 could be any type of photodetector that produces a temporally correlated electrical signal in response to an incident optical signal—e.g., a silicon photomultiplier (SiPM) or sub-Geiger avalanche photodiodes (APDs) (e.g., a sense amplifier could be placed next to the APD to detect an analog current signal which is higher than a predefined threshold). The detection and binning circuitry 352 performs histogramming in response to the avalanche signals from the SPAD 350 using the histogramming techniques described herein, and the memory 354 holds the histogram data in the bins in accordance with the histogramming techniques described herein. Further still, the detection and binning circuitry 352 may perform additional operations that support SPAD-based light detection and histogramming, such as time digitization operations, quenching the avalanche signals generated by the SPAD 350 in response to photon arrival, recharging the SPAD, monitoring for memory saturation, providing and filter supply currents and voltages, etc.

SPAD 350, circuitry 352, and memory 354 are all preferably resident inside the pixel 304. For example, circuitry 352 and/or memory 354 can be on the same substrate or die as the SPAD array. In another example, the circuitry 352 and/or memory 354 can be inside a bonded pixel on a different die or substrate (e.g., where the SPAD 350 is on a SPAD wafer while the circuitry 352 and the memory 354 are on a CMOS readout integrated circuit (ROIC) wafer which is bonded to the SPAD wafer, or while the memory 354 is on a memory wafer which is bonded to the CMOS ROIC wafer) where the die(s)/substrate(s) for the circuitry 352 and/or memory 354 is/are interconnected (e.g., vertically interconnected) with the SPAD array die/substrate. Moreover, each pixel 304 can include its own instance of the one or more SPADs 350, circuitry 352, and memory 354, or such circuitry may be shared by more than one pixel. Further still, in other example embodiments, the circuitry 352 and/or memory 354 are on-chip but outside the pixel array. In still other example embodiments, the circuitry 352 and/or memory 354 can be outside the chip such as where the memory 354 is on an external board.

The optical receiver 300 also comprises readout circuitry 308 that is responsible for reading histogram data out of the pixel memories 354 and signal processing circuitry 310 that is responsible for processing the histogram data to determine information such as range to objects in the field of view for the photodetector array 302. The readout circuitry 308 and/or signal processing circuitry 310 can be internal to or external to the pixel 304 and/or the photodetector array 302.

As noted above, depending on the needs and desires of a practitioner, the readout circuitry 308 may read out the histogram data from the memory 354 once at the conclusion of the depth-image frame (histogram readout on a per depth-image frame basis), or it may read out the histogram data from the memory 354 at the conclusion of each collection subframe (e.g., two readouts per depth-image frame, which serves as a histogram readout on a per collection subframe basis).

The signal processing circuitry 310 may process the histogram data to identify the positions of the bins containing signal counts in the histogram data (namely, the peak bins where the signal counts would represent returns of the emitted light pulses from a target) as well as to identify other parameters, such as the background counts (which would represent ambient light or noise), and then use a lookup table to map the bin positions for the peak bins to the precise peak position from the bin mappings. Alternately, the signal processing circuitry 310 may (1) identify the peak bins and other system parameters such as background counts and (2) use a formula to calculate the precise peak position based on this information. This effectively unwraps the correct signal peak position from the wrapped histograms. The signal processing circuitry 310 may also employ techniques in software or hardware that interpolate the range with a resolution better than the emitter's pulse widths and bin widths of the relevant bin maps based on a priori knowledge of the true shape of the histogram (e.g., its shape if it was measured with infinitesimally short bin width and without noise). Further still, the signal processing circuitry 310 may employ signal processing techniques such as envelope matching or other lookup techniques to identify more than one return from more than two histogram peak bins. The signal processing circuitry 310 may include one or more compute resources for carrying out histogram data processing operations (e.g., one or more microprocessors, field programmable gate arrays (FPGAs) and/or application-specific integrated circuits (ASICs)).

Further still, there may be scenarios where the field of view for the pixel 304 includes more than one target at different ranges. There may also be scenarios where mist, smoke, dust, or dirt in the environment or on the receiver 300 itself gets sensed and manifested as multiple returns in a frame. If the signal processing circuitry 310 determines that the histogram data indicates the existence of multiple returns at different ranges (e.g., 4 peak bins in the histogram data), then, in an example embodiment, the signal processing circuitry 310 can invalidate the acquisition. In another example embodiment, the signal processing circuitry 310 can resolve the different returns—for example, the bin mappings can be selected by a combinatorial process where, in the case of returns from two targets (i.e., 4 peak bins), the peak bins are sufficiently separated for all range points and a unique pair of range points will always correspond to any 4 peak bin positions.

In an example embodiment, the optical receiver 300 can take the form of a direct time-of-flight (dTOF) sensor such as a dTOF lidar sensor.

Figure 3B:
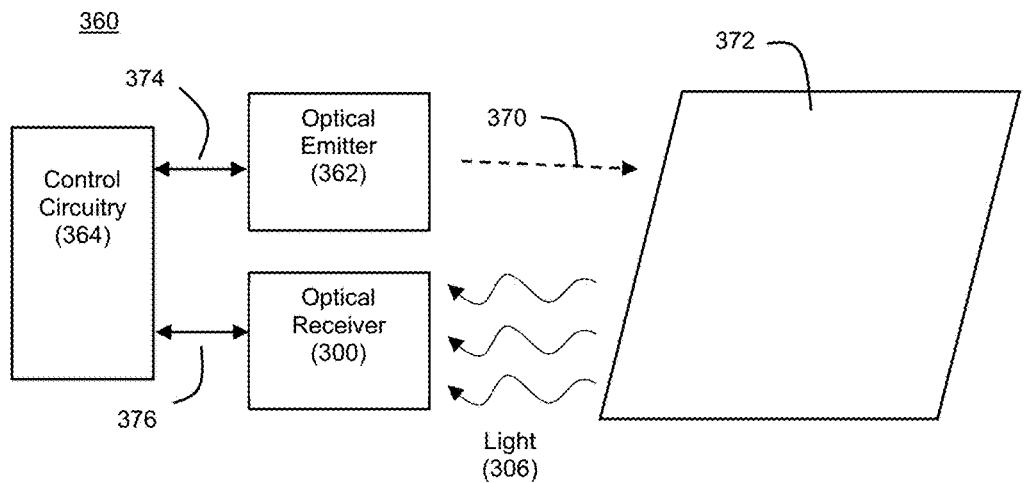
FIG. 3B depicts an example optical system that comprises an optical receiver according to FIG. 3A in combination with an optical emitter.

The optical receiver 300 can be employed in an optical system 360 such as that shown by FIG. 3B. Optical system 360 shown by FIG. 3B also includes an optical emitter 362 that emits light pulses 370 into an environment 372 for the optical receiver 300 (where the environment 372 encompasses the field of view for each pixel 304). The incident light 306 will include returns (echoes) from these light pulses 370, and the histogram data generated by the optical receiver 300 using the techniques described herein will allow the optical receiver 300 to include range information in depth-image frames derived from the incident light 306. Control circuitry 364 can coordinate the operation of the optical emitter 362 and optical receiver 300 such as by controlling the timing and targeting of light pulses 370 by the optical emitter 362 via data path 374 and controlling operational parameters for the optical receiver 300 as well as processing depth-image frames via data path 376.

The optical emitter 362 can include a pulsed laser emitter such as one or more VCSELs for emitting laser pulses, and it may also include beam shaping optics such as a diffuser. The optical receiver 300 may also include receive optics such as a collection lens, a spectral filter that passes reflected laser pulses within incident light 306 but rejects much of the incident light 306 that is uncorrelated to the laser pulse emissions. The photodetector array 302 may be single tier, dual tier, or more than dual tier. For example, one tier may comprise the array of SPADs 350 and other tiers may include timing, sampling, amplification, power supply, memory, and processing circuitry.

As an example, the optical system 360 can be a lidar system such as a flash lidar system or a scanning lidar system. Such lidar systems can be used for a variety of applications, including automotive applications, industrial automation, security monitoring, aerial and environmental monitoring, etc. The optical system 360 may also take the form of a 3D camera, such as a 3D camera incorporated into a mobile device such as a smart phone. For example, the emitter 362 may illuminate the whole scene or may use structured light to illuminate spots in the scene (where multiple combinations of spots may be illuminated at a given time). The photodetector array 302 may identify which pixels 304 are sensing these illuminated spots at any given time; and the receiver 300 can process only the outputs from those pixels 304 (e.g., as event-driven pixel processing). As additional examples, the optical system 360 can be a FLIM, a TD-NIRS imager, an acousto-optical imager, and/or a TOF-PET imager.

In an example where the optical system 360 is a scanning system, the optical emitter 362 can be an array of emitters (e.g., a 2D array of VCSELs or the like). Control circuitry 364 can select and activate the emitters in groups (e.g., activating one or more columns of the emitters, one or more rows of the emitters, etc.) over time time to fire multiple light pulses at a time. The optical receiver 300 can, in an example embodiment, activate only the group of pixels 304 in the photodetector array 302 whose fields of view are illuminated by the selected emitters that are firing light pulses. In this configuration, the memory array for creating the histogram data can be shared by the activated group of pixels 304 (e.g., if a whole column of pixels 304 is active at one time, then the memory array of histogram data can be shared by the whole column of pixels 304; if a whole row of pixels is active at one time, then the memory of histogram data can be shared by the whole row of pixels 304; etc.). Each SPAD 350 in the active pixels 304 can image the whole azimuth at a given elevation (or vice versa if applicable), and a new histogram can be generated each time a new group of emitters in the array of emitters starts firing. In another example embodiment, more than one SPAD 350 can be connected to a memory array so that more than one photon may be detected within the dead time interval for the SPAD 350 (which yield higher dynamic range). This configuration can be characterized as a silicon photomultiplier (SiPM) arrangement.

Practitioners can choose to design the optical system 360 so that it exhibits any of a number of different operational parameters based on what the practitioners want to accomplish. For example, the number of pixels in the photodetector array 302 can include 100, 200, 1,000, 5,000, 10,000, 25,000, 100,000, 1 million, 20 million pixels, etc. Similarly, the detection range supported by the optical receiver 300 may range from 50 cm to tens of kilometers (e.g., 50 km, 60 km, 70 km, etc.). The number of bins in the memory 354 may range from 10 to 5,000 bins. Also, the bin widths used for the histogramming process may range from 50 fsec to 50 μsec. The number of light pulse cycles included in the first and second collection subframes may range from 10 to 50,000 light pulse cycles, and each collection subframe need not encompass the same number of light pulse cycles. Also, the pulse width for the light pulses may range from 10 fsec to 500 μsec.

Figure 4:
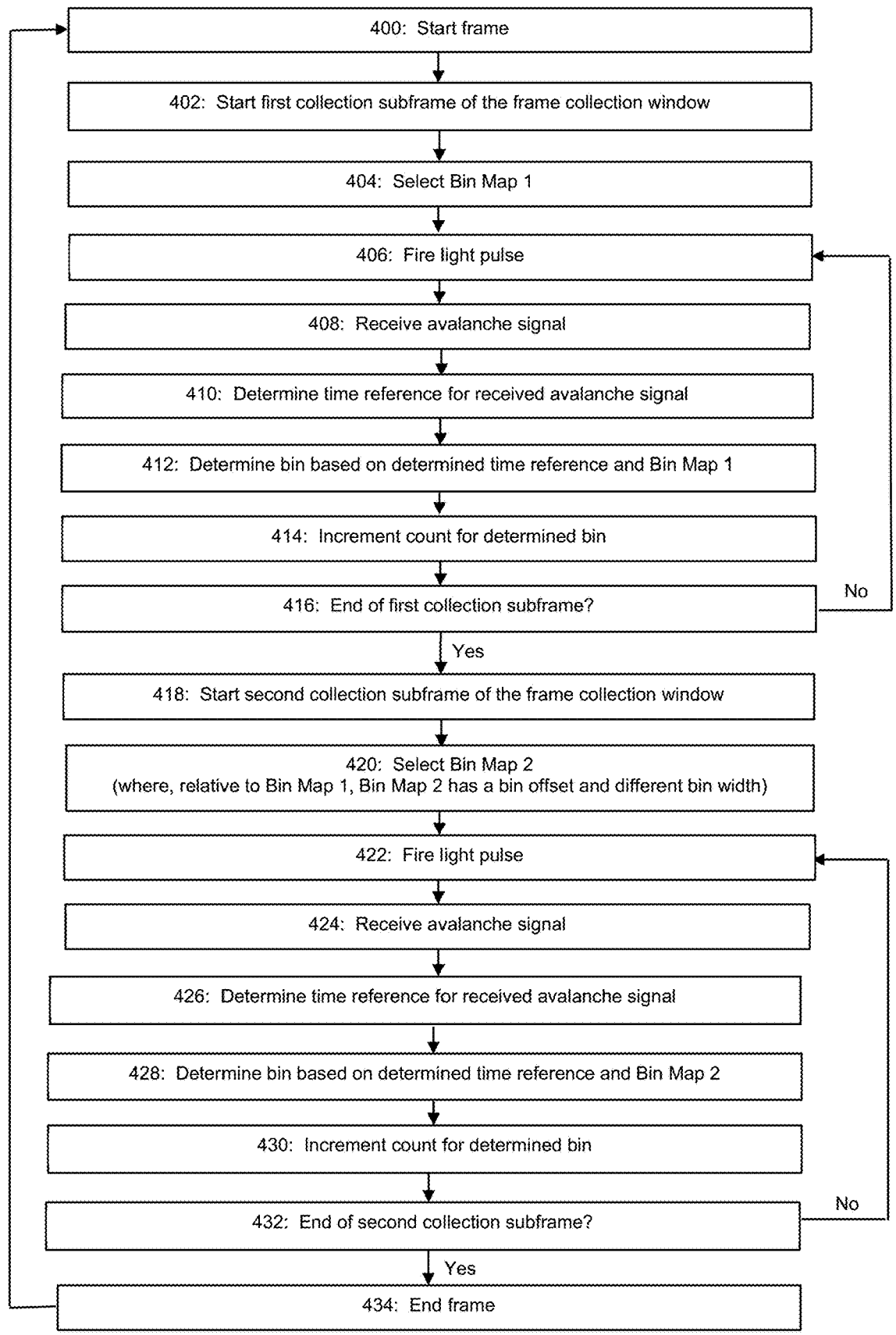
FIG. 4 depicts an example process flow for memory efficient histogramming according to an example embodiment.

FIG. 4 depicts an example process flow for the per-pixel histogramming techniques described herein. At step 400, the depth-image frame starts. As an example, this depth-image frame can be a lidar frame. At step 402, the first collection subframe of the depth-image frame starts, and at step 404, the bin map to be used for the first collection subframe is selected (e.g., bin map 200 can serve as Bin Map 1).

Figure 1B:
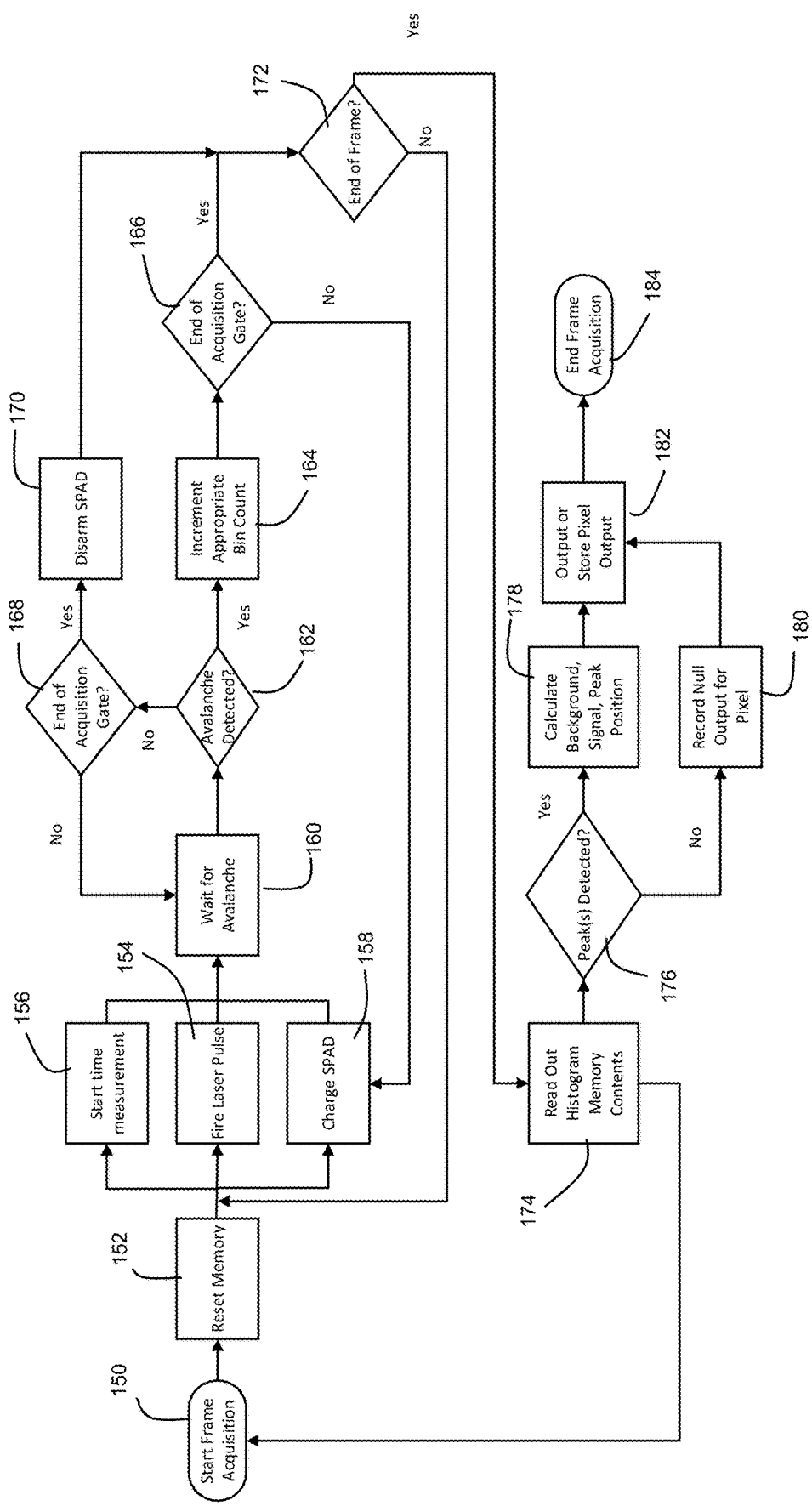
FIG. 1B shows an example process flow for histogramming to support range detections using a mapping of time to bins as shown by FIG. 1A.
Figure 1C:
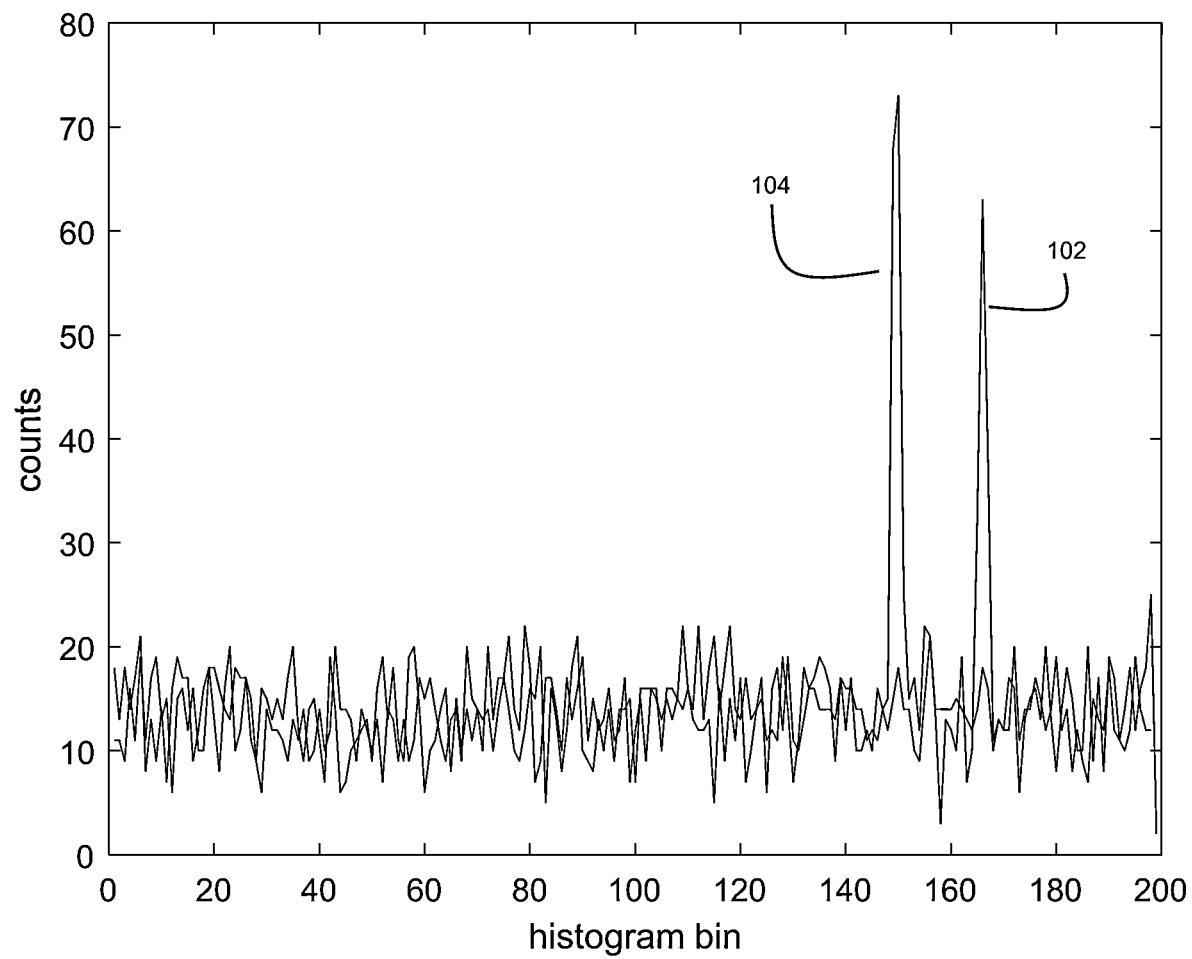
FIG. 1C shows example histograms that can be developed using conventional bin mapping approaches for different bin widths.
Figure 1D:
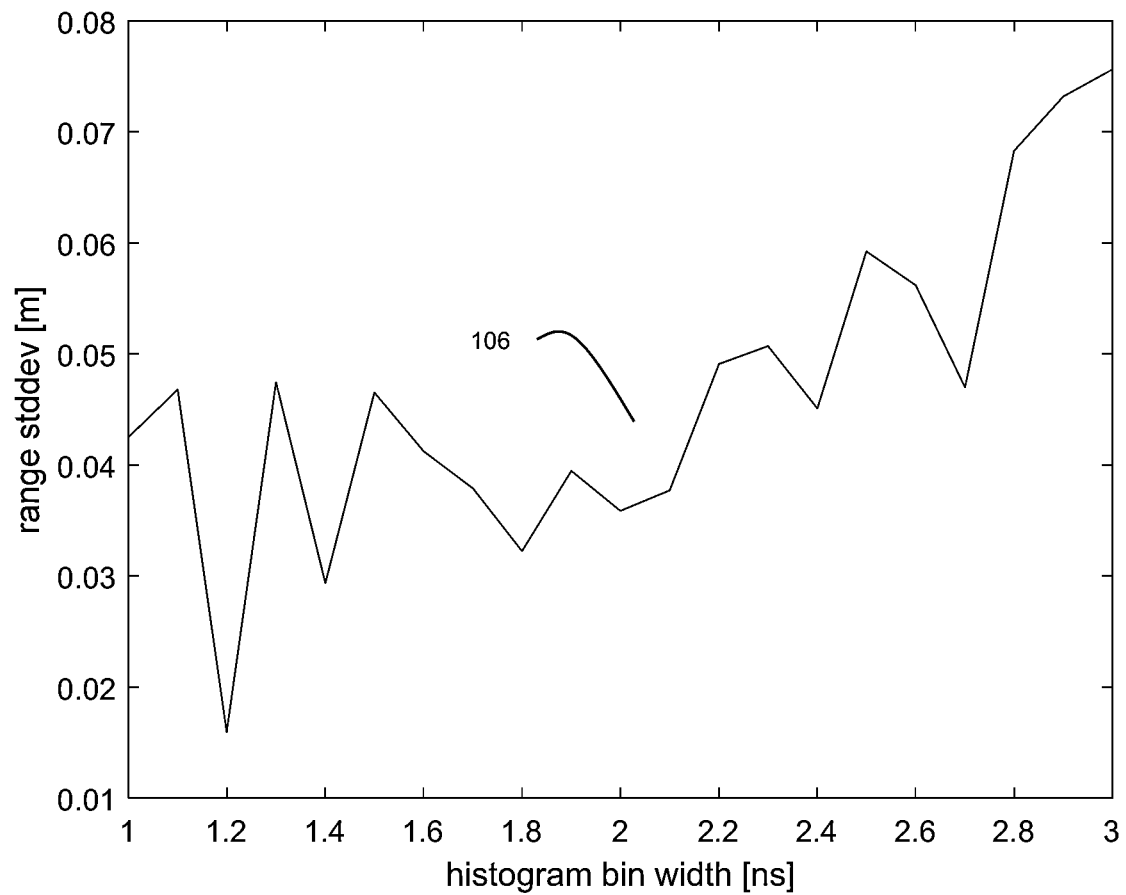
FIG. 1D shows an example plot that demonstrates the relationship between bin width and range imprecision.
Figure 1E:
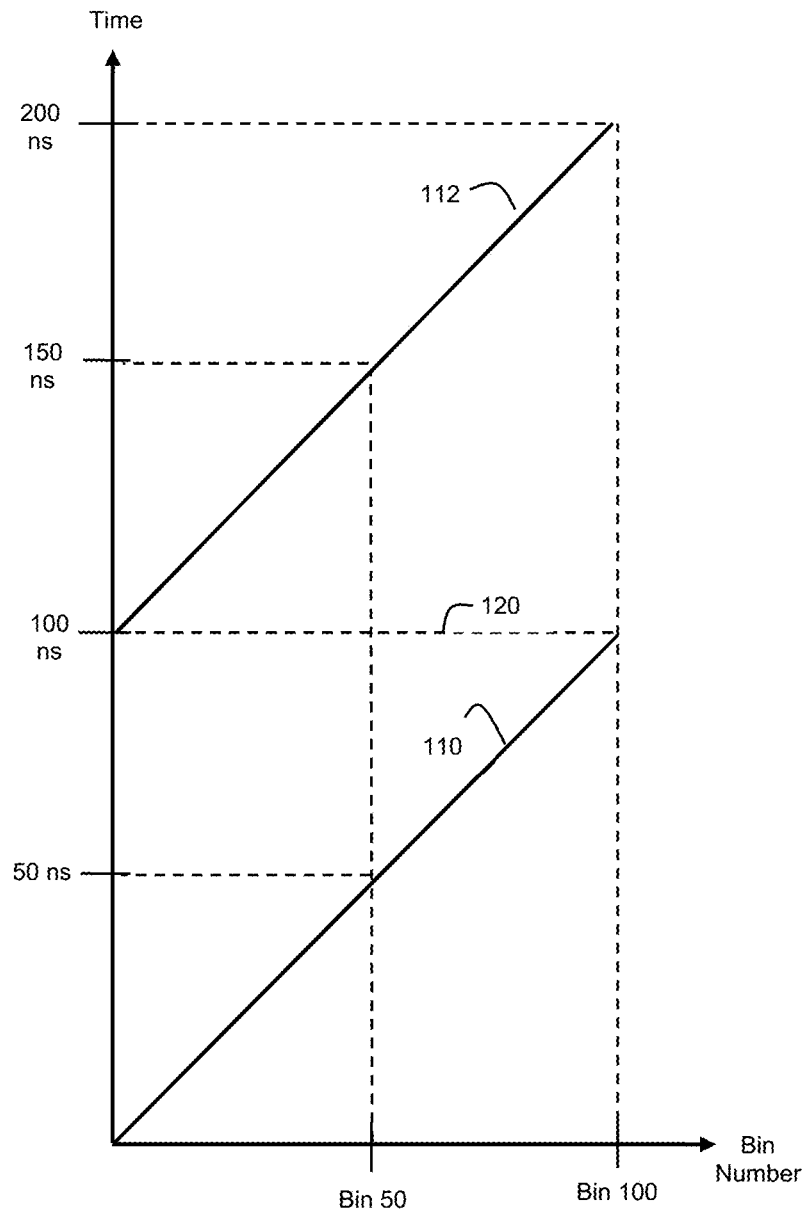
FIG. 1E shows an example mapping of time to bins for use when histogramming, where, relative to FIG. 1A, the number of bins is halved, thereby also halving the detection range when using conventional histogramming techniques.

At step 406, the optical emitter 360 fires a light pulse into the field of view for the optical receiver (e.g., a laser pulse shot), and circuitry 352 begins checking whether the SPAD 350 has produced an avalanche signal (step 408). If no avalanche signal is detected over the course of the detection range for the pixel (e.g., the acquisition gate as shown by FIG. 1B), then the process flow can proceed to step 416 without performing steps 408, 410, 412, and 414. But, in the event that step 406 results in a detection of the avalanche signal within the detection range/acquisition gate, the circuitry 352 at step 410 determines a time reference for this detection (where this time reference can be anchored to the light pulse transmission at step 406 and thus represent a time of arrival for the photon that produced the avalanche signal relative to the light pulse emission). At step 412, the circuitry 352 determines the bin that is associated with the determined time reference by the bin map selected at step 404 (Bin Map 1). At step 414, the circuitry 352 increments the count value stored by the determined bin.

At step 416, the circuitry 352 determines whether the end of the first collection subframe has been reached. If the first collection subframe has not ended, then the process flow returns to step 406 for the firing of the next light pulse (at which point the time reference is reset). The first collection subframe will encompass a plurality of light pulse cycles (e.g., 100, 500, 1,000, 2,500, 5,000, 10,000, etc. light pulse cycles), so the process flow will loop back to step 406 many times during the first collection subframe. The determination of whether the first collection subframe has ended can be based on a time threshold for the first collection subframe or a shot threshold as compared to a counter value that represents the number of light pulse cycles that have thus far occurred during the first collection subframe.

If step 416 results in a conclusion that the first collection subframe has ended, then the process flow proceeds to step 418 (where the second collection subframe begins). For the second collection subframe, at step 420, the bin map to be used for the second collection subframe is selected (e.g., bin maps 206 or 208 can serve as Bin Map 2). For an example where it is desired to support single readout of the histogram data by the readout circuitry 308, Bin Map 2 can exhibit a different bin width and a bin offset relative to Bin Map 1 that satisfy the two conditions discussed above. At this point, steps 422, 424, 426, 428, and 430 operate in a similar fashion as described above for steps 406, 408, 410, 412, and 414, albeit where Bin Map 2 is used to map the timed avalanche signal to an appropriate bin in memory 354 (rather than Bin Map 1).

At step 432, the circuitry 352 determines whether the end of the second collection subframe has been reached. If the second collection subframe has not ended, then the process flow returns to step 422 for the firing of the next light pulse (at which point the time reference is reset). The second collection subframe will also encompass a plurality of light pulse cycles (e.g., 100, 500, 1,000, 2,500, 5,000, 10,000, etc. light pulse cycles; although the second collection subframe need not encompass the same number of light pulse cycles as the first collection subframe), so the process flow will loop back to step 422 many times during the second collection subframe. The determination of whether the second collection subframe has ended can be based on a time threshold for the second collection subframe or a shot threshold as compared to a counter value that represents the number of light pulse cycles that have thus far occurred during the second collection subframe. If step 432 results in a determination that the second collection subframe has ended, this means that the frame has been collected and the process flow for that frame can end (step 434). At this point, the histogram data is ready for readout from memory 354, and the process flow can start fresh at step 400 for the next depth-image frame.

In this fashion, the operation of the FIG. 4 process flow will produce histogram data in memory 354 where the bin positions of the peaks of the histogram data will be resolvable to identify the range to an object in the field of view for the subject pixel using the peak mapping techniques discussed above (presuming that the object is located within the detection range of the subject pixel).

Figure 5:
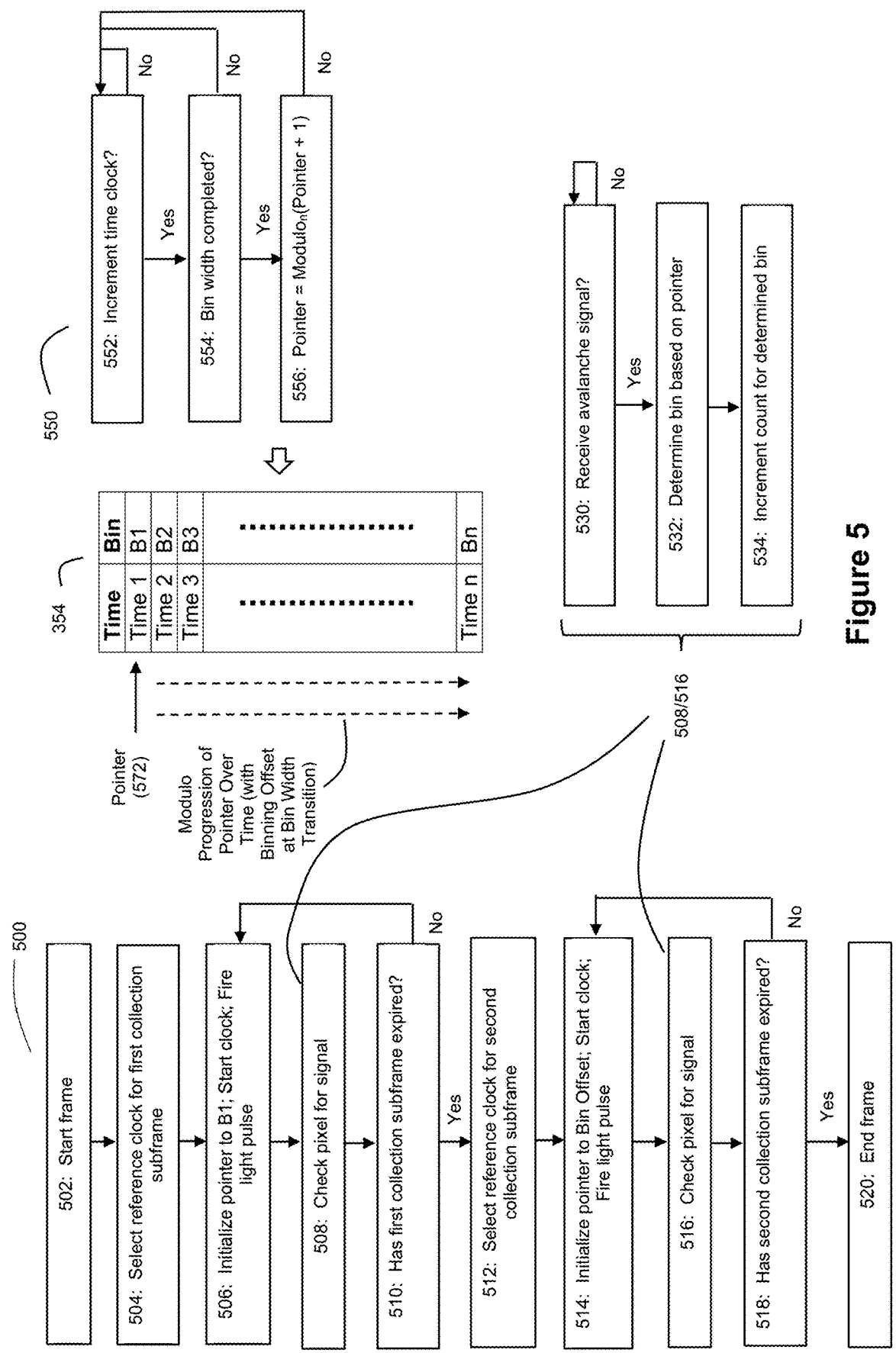
FIG. 5 depicts another example process flow for memory efficient histogramming according to another example embodiment.

FIG. 5 shows an example version of the FIG. 4 process flow where a pointer is used to manage which bins are updated when photons are detected by the SPAD 350. In this example, the memory 354 comprises a plurality of addresses which serve as the bins and are associated with different times that correspond to the bin widths of the bin maps. In this example, there are n bins in memory 354. A pointer 572 identifies the bin that is aligned with the current time. As time progresses, as demarked by a time reference such as a clock signal used by circuitry 352, the pointer 572 cycles through the bins according to a modulo n progression with units of time corresponding to the bin widths.

Process flow 500 shows the overall process flow for the histogramming operations. At step 502, the depth-image frame starts. At step 504, the circuitry 352 selects a reference clock to be used for the first collection subframe of the frame's collection time. A practitioner may find it desirable to have this reference clock increment in units of time that are equal to the bin width of the bin map used for the first collection subframe (or where the subject bin width is some integer multiple of the clock interval). For example, if the bin width for the bin map of the first collection subframe is 1 ns, then it would be desirable for the reference clock selected at step 504 to exhibit a clock cycle or a clock phase of 1 ns for each tick of the clock.

At step 506, pointer 572 is initialized to B1 (which indicates that the pointer 572 is identifying that Bin B1 of the memory 354 is the bin mapped to the current time). At step 506, the selected reference clock is also started, and a light pulse is fired. Once the light pulse is fired, the pointer management process flow 550 operates to update the value of pointer 572 in a manner that keeps track of elapsed time. This pointer management process flow 550 operates while the circuitry 352 checks the pixel for an avalanche signal (step 508). With process flow 550, the circuitry 352 checks whether the selected reference clock has incremented (step 552). If yes, the circuitry 352 checks whether the bin width for the first collection subframe has been completed (step 554). If the bin width has not completed, the pointer management process flow returns to step 552 to wait for the next clock increment. If the bin width has completed, then the pointer 572 is incremented at step 556 to the next bin on a modulo n basis. For example, at the first completion of the bin width, the pointer 572 would increment from B1 to B2 to signify that the current time maps to bin B1 of the memory 354. From step 556, the pointer management process flow 550 returns to step 552 to check for the next clock increment. It should be understood that steps 552 and 554 can be combined as a single step if the bin width matches the clock increment (e.g., 1 ns bin width and 1 ns clock increment). Accordingly, it should be understood that the management of the pointer 572 during the first collection subframe operates to define the bin map for the first collection subframe.

While pointer 572 is being updated in accordance with the pointer management process flow 550, the circuitry 352 is also performing step 508 to check the pixel for a signal. Step 508 can include a check as to whether an avalanche signal has been received from the SPAD 350 (step 530). If not, the circuitry 352 can continue to check for the avalanche signal at step 530 while the pointer 572 continues to update in accordance with the elapsed amount of time until the time corresponding to the detection range of the pixel has been reached (at which point step 508 ends). If step 530 results in the detection of the avalanche signal, then the circuitry 532 determines the bin that is aligned with the time of arrival for this detection based on the pointer 572. The bin in memory 354 that is identified by the value of pointer 572 when the avalanche signal is received serves as the determined bin at step 532. At step 534, the circuitry 352 increments the count for the determined bin. This count can be represented by bit values stored in the memory address for the subject bin. It should also be understood that step 508 can include a quenching of the avalanche signal by the SPAD 350 if an avalanche signal it detected.

Upon completion of step 508, the circuitry 352 checks whether the first collection subframe has ended (step 510). This step 510 can be performed in the manner described above for step 416 of FIG. 4. If the first collection subframe has not yet ended, the process flow returns to step 506, where the pointer is initialized again to B1 and the clock starts anew when the next light pulse fires. As noted above, the process flow will cycle through steps 506 and 508 a number of times until the first collection subframe is completed.

Upon the completion of the first collection subframe, the second collection subframe begins at step 512. At step 512, the reference clock is adjusted or switched to select a new clock interval that is used during the second collection subframe. For example, a master clock may have a frequency of 2 GHz, which is a clock cycle time of 500 psec. During the first subframe, a circuit generates a first local bin clock every 2 clock cycles, i.e., every 1 nsec (where this first local bin clock serves as the reference clock during the first subframe). During a second subframe, a circuit generates a second local bin clock every 2.5 clock cycles (e.g., every 2 complete cycles+a clock phase), i.e., every 1.25 ns (where this second local bin clock serves as the reference clock during the second subframe). Accordingly, the clock interval for the second collection subframe will be either longer or shorter than the clock interval used during the first collection subframe. This new clock interval can match the bin width used during the second collection subframe. In this fashion, the same pointer management process flow 550 can be used for both the first and second collection subframes.

At step 514, the circuitry 352 initializes pointer 572 to the Bin Offset 204 used for the second collection subframe. The clock selected at 512 is started as the light pulse is fired. At this point, the pointer management process flow 550 operates to increment the value of pointer 572 as time elapses, and step 516 checks the pixel for an avalanche signal. It should be understood that during the second collection subframe, the pointer 572 increments on a modulo n basis according to intervals that correspond to the reference clock selected at step 512. This has the effect of changing the bin width for the second collection subframe. Moreover, since the pointer is initialized to Bin Offset 204 at step 514, it should be understood that the starting bin during the second collection subframe will be a different bin than the starting bin for the first collection subframe. Moreover, it should be understood that the management of the pointer 572 during the second collection subframe operates to define the bin map for the second collection subframe.

Step 516 can comprise steps 530, 532, and 534 as discussed above for step 508; albeit where the histogramming arising from steps 530, 532, and 534 will be using a different mapping of bins to time than was used during the first collection subframe.

Upon completion of step 516, the circuitry 352 checks whether the second collection subframe has ended (step 518). This step 518 can be performed in the manner described above for step 432 of FIG. 4. If the second collection subframe has not yet ended, the process flow returns to step 514, where the pointer is initialized again to Bin Offset 204 and the clock starts anew when the next light pulse fires. As noted above, the process flow will cycle through steps 514 and 516 a number of times until the second collection subframe is completed.

Once the second collection subframe is completed, the system can end the collection for the subject frame (step 520). At this point, memory 354 stores the histogram data for the first and second collection subframes; and the range to the object that the pixel is looking at can be resolved using the techniques discussed above (presuming the object is within the detection range of the pixel).

Figure 6A:
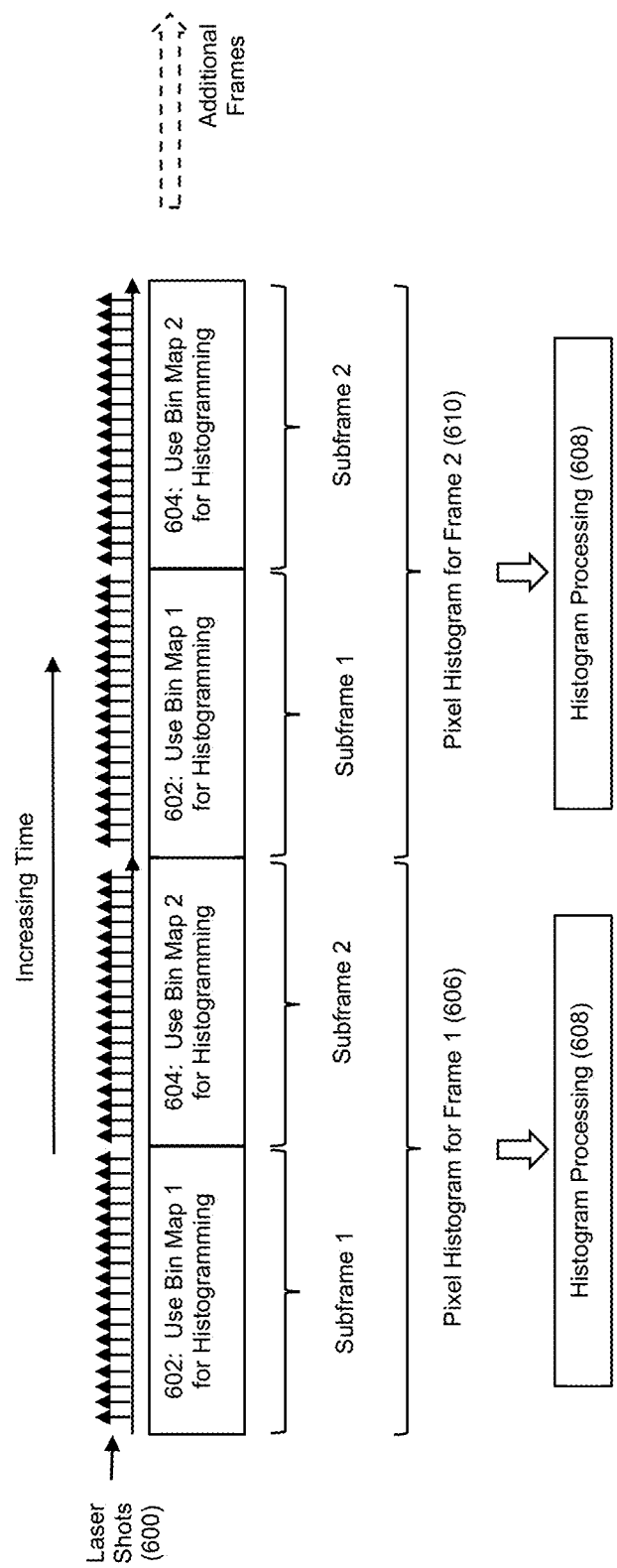
FIGS. 6A and 6B depict examples of operational timelines for pixel histogram generation to support ranging to an object according to example embodiments.

FIG. 6A depicts an example timeline for pixel histogramming in accordance with example embodiments described herein. As light pulses such as laser shots 600 are fired repeatedly over the course of various depth-image frames, the collection time for each frame is subdivided into different collection subframes. As shown by FIG. 6A, the collection time for each frame is subdivided into the first collection subframe (Subframe 1) and the second collection subframe (Subframe 2). Subframe 1 is associated with Bin Map 1, and Subframe 2 is associated with Bin Map 2, where the two bin maps exhibit characteristics as discussed above. During Subframe 1, the histogramming process 602 uses Bin Map 1 to generate the histogram data. During Subframe 2, the histogramming process 604 uses Bin Map 2 to generate the histogram data. This results in a pixel histogram 606 for Frame 1 and a pixel histogram 610 for Frame 2 (and so on for subsequent frames). Histogram processing 608 can then be performed on each pixel histogram 606, 610 to resolve the range to the target (e.g., see FIG. 2D for an example of how peak positions in the pixel histogram can be mapped to a time of arrival for returns from the target, which in turn can be readily translated into a range for the target).

As noted above, each pixel histogram may be read out twice per frame (after the conclusion of each collection subframe) or it may be read out once per frame (after the conclusion of the second collection subframe).

Figure 6B:
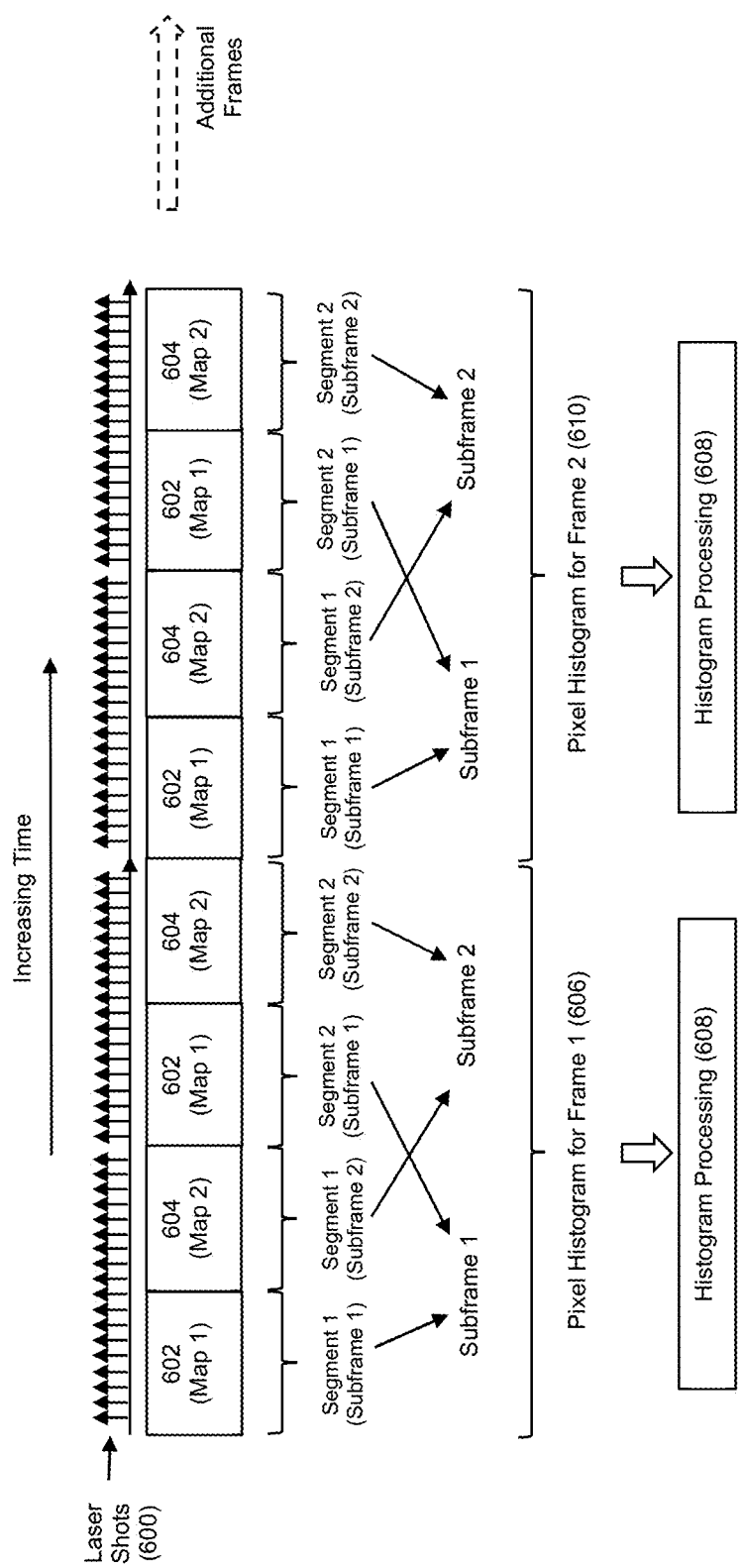

While FIG. 6A shows an example where the first collection subframe covers a contiguous time period and the second collection subframe covers a subsequent contiguous time period, it should be understood that this need not be the case. For example, the first and second collection subframes can be subdivided into a plurality of discontiguous time segments, and the time segments for the first and second collection subframes can be interspersed with each other. An example of such an approach is shown by FIG. 6B, although it should be understood that each subframe may be divided into more than 2 discontiguous time segments if desired by a practitioner. This interspersing of segments within the different collection subframes can be beneficial for reducing motion artifacts. For example, if an object is moving and all of the laser shots for the first subframe precede all of the laser shots for the second subframe, then there may be a risk that the histogram peak bin pairs for the first and second subframes will not map to the correct range. However, this risk is reduced when time segments from the different subframes are interspersed.

Figure 7:
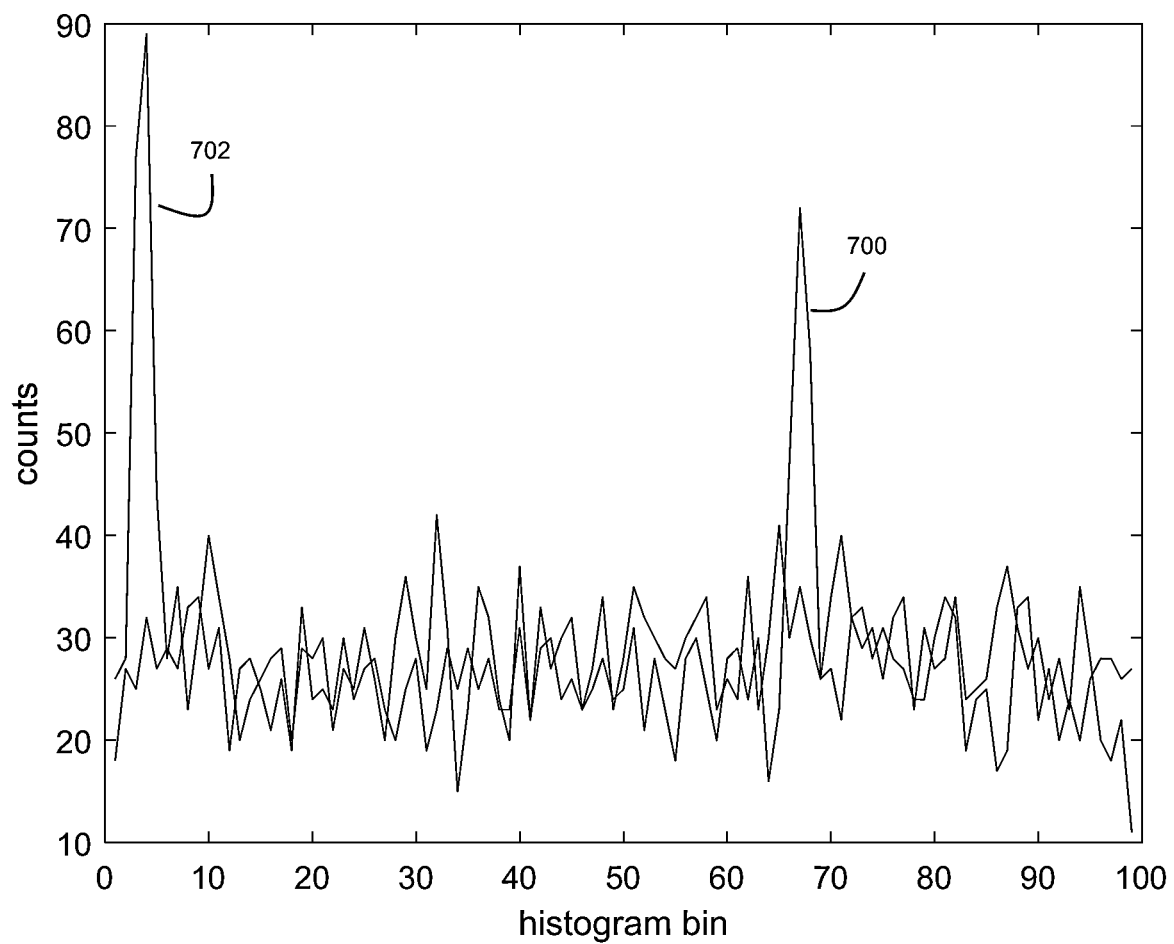
FIG. 7 depicts example histograms for first and second collection subframes, where the combination of peak bins resolves range to an object.

FIG. 7 depicts example histograms 700 and 702 that correspond to readouts of histogram data on a per collection subframe basis. In this example, histogram 700 corresponds to the first collection subframe, and histogram 702 corresponds to the second collection subframe. It can be seen that histogram 700 includes a peak at Bin 67, and histogram 702 includes a peak at Bin 4. These histograms can be processed by signal processing circuitry 310 to detect that these peaks qualify as peak bins and then map the bin positions for these peak bins to the interpolated time of arrival (see FIG. 2D). As noted above, the peak bins will exhibit a time correlation to the reference time such as the firing of the light pulses. Most noise sources (e.g., sunlight, other emitters, thermally-generated avalanches, tunneling-generated avalanches, etc.) will be uncorrelated to the reference time so they will be evenly distributed on the histogram (like a DC-level signal with some statistical fluctuation on top). Other noise sources (e.g., afterpulsing) will have a statistical distribution which is different than the known statistical distribution of the pixel (e.g., afterpulsing typically follows an exponential probability with a comparably very long lifetime of microseconds). Still other algorithmic techniques can be used to distinguish other noise sources from return signals such as cross-talk from other pixels 304, stray light, or multipath returns).

Accordingly, the histogram processing 608 performed by the signal processing circuitry 310 may use correlation and other noise discrimination techniques to determine which of the bins qualify as peak bins. The signal processing circuitry 310 can then map the determined peak bins to a corresponding time of arrival window (range point) using a lookup table that defines the corresponding time of arrival window (or range point) for each pair of peak bins that are possible for the times of arrival windows (range points) supported by the pixel 304. The signal processing circuitry 310 may also interpolate a more precise signal peak position within the mapped time of arrival window using techniques such as interpolation or the like. The signal processing circuitry 310 may employ a processor for such interpolations.

It should be understood that the readout circuitry 308 and signal processing circuitry 310 may optionally be included inside the pixel 304; but these components could also be deployed outside the pixel 304 (either on-chip or off-chip). In addition to range determinations based on peak detection, the signal processing circuitry 310 may also perform background estimation, signal value, and background-subtracted signal operations on the histogram data. Reading histograms 700 and 702 sequentially from memory 354 on a per collection subframe basis allows us to detect the peak bin twice and at different offsets between the bin edge and the signal peak, which helps reduce certain undesirable effects. It also helps us know with certainty which histogram came from which subframe, and therefore we can populate the (bin-widths, bin_offset) space more densely—for example we can detect more echoes per pixel uniquely, or we can fold the histogram more times, thus saving memory. The signal to noise ratio (SNR) of each histogram 700 and 702 would be sqrt(2) lower than for a single histogram that aggregates 700 and 702 (since both the signal and background would be reduced by a factor of 2 and the noise scales as the square root of the background); but since we perform two peak detections on two separate histograms 700 and 702 with different bin edge to signal peak separations, this penalty will be minimal.

Figure 8:
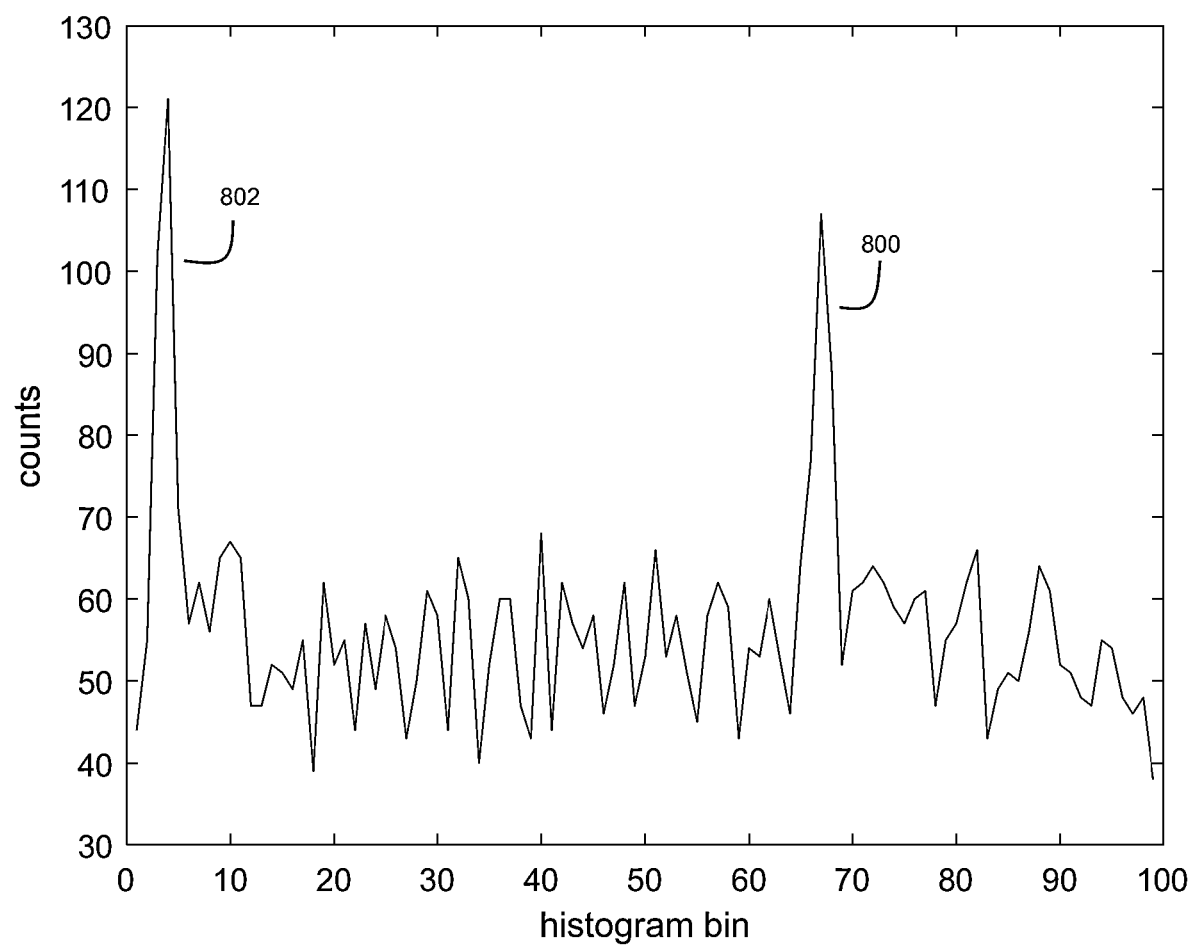
FIG. 8 depicts an example of a combined histogram for the first and second collection subframes, where the combination of peak bins resolves range to an object.

FIG. 8 depicts an example where rather than reading out histograms 700 and 702 from memory 354 at the end of each collection subframe, the readout circuitry 308 instead performs a single readout of the histogram data from memory 354 after the end of the second collection subframe. In this fashion, the histogram of FIG. 8 represents the aggregation of histograms 700 and 702 from FIG. 7. The benefit of the single readout per depth-image frame is that this improves the effective frame rate of the sensor, as well as the required data throughput from the sensor. Moreover it facilitates interleaving of the two bin widths if desired by a practitioner (e.g., see FIG. 6B), thus reducing potential motion-induced errors. It can be seen from FIG. 8 that the single histogram shows a peak bin 800 at Bin 67 and a peak bin 802 at Bin 4. As noted above, a lookup table can map this peak bin pair to a range time window.

Software can be used to identify whether a pair of interpolated peaks corresponds to a valid range; and if it does not, the software can invalidate the measurement as spurious or erroneous.

Software can also be used to identify and evaluate whether a given set of choices or values for detection range, number of bins, bin widths (range resolution), and pulse width will be able to satisfy the "No Overlap" and "Unique Combination of Unordered Peak Bins per Range" conditions discussed above so as to support single readout of the histogram data from memory 354 per frame. This software can numerically test the bin mappings that arise from given values for these parameters to determine whether both conditions are satisfied.

The detection range of the pixel corresponds to the maximum signal round-trip time covered by the system. This maximum signal round-trip time can be computed based on the total number of bins, the bin width (for a given collection subframe), and the number of wraparounds of the bins (for the given collection subframe).

A defined set of values for the total number of bins, bin widths for the first and second collection subframes, and bin offset as between the first and second collection subframes then allows for a table such as that shown by FIG. 2D and FIG. 9 to be constructed. For example, FIG. 9 shows an example table that includes a partial list of range values supported by an example system along with their corresponding peak bins. The bin sizing (number of bins and bin widths) and bin offsetting as between the bin maps for the first and second collection subframes over the detection range of the system as reflected by this table can then be tested as to whether they satisfy the "no overlap" condition.

The pulse width for the system can be used to define the minimum bin separation that is needed between the first and second bin maps to prevent an overlap of peak bins for the two collection subframes. In the example of FIG. 9, the relevant pulse width is 2 ns, and the shorter bin width is 1 ns (for the first collection subframe). This means that a given return signal in the histogram data for the first collection subframe may occupy 3 bins. Accordingly, the "no overlap" condition will require at minimum a 3 bin separation between the bins of each peak bin pair for all ranges in FIG. 9. This can readily be accomplished by comparing the bin numbers in the "first pass bin" and "second pass bin" columns of FIG. 9 to test whether there is at least a 3 bin difference between all bin pairs (see the "OK?" column in FIG. 9).

Presuming that each bin pair passes the "no overlap" condition, the software can also test for the "Unique Combination of Unordered Peak Bins per Range" condition. As part of this, each peak bin pair for the different ranges can be encoded in a manner so that each unique peak bin pair has its own unique code. For example, if a given range value has a peak bin during the first collection subframe of Bin AB and a peak bin during the second collection subframe of Bin CD, this peak bin pair can be encoded as 1AB1CD (where a value of 100 is added to both codes with concatenation of the results). It should be understood that this encoding is just an example and there will be myriads of additional ways to form unique codes from bin pairs. This coding technique can then be applied to each range value from the FIG. 9 table so that each range value has a corresponding code. A software program can then check to see whether any of the codes are repeated in the table (either in the forward direction or in the reverse direction). If so, then the "Unique Combination of Unordered Peak Bins per Range" condition would fail and one or more different values would need to be used for the total number of bins, bin widths, and bin offset. However, if none of the codes are repeated (and the minimum bin separation requirement is satisfied), then the system can use the bin maps defined by the values for the first and second collection subframes.

While the invention has been described above in relation to its example embodiments, various modifications may be made thereto that still fall within the invention's scope. For example, while the example embodiments discussed above divide the frame collection time into a first and second subframe, it should be understood that more than 2 subframes may be acquired using different bin maps if desired by a practitioner (e.g., a third subframe using a third bin map, etc.). Further still, while the examples discussed above employ bin maps for the different collection subframes where each bin map has a regularity in its mapping of time to bins (as indicated by the linear nature of the example plots shown by FIGS. 2A-2C which show linear increases in bin number and time on a modulo basis), it should be understood that some practitioners may choose to map times to bins on an irregular basis, such as a randomized basis, so long as the assignments allow for range disambiguation (if readout occurs on a per collection subframe basis) or range disambiguation in combination with the "No Overlap" and "Unique Combination of Unordered Peak Bins per Range" conditions discussed above (if readout occurs on a per depth-image frame basis). These and other modifications to the invention will be recognizable upon review of the teachings herein.

What is claimed is:

1. A system comprising:
a photodetector having a field of view, wherein the photodetector generates signals indicative of photon detections in response to incident light over time;
a memory; and
a circuit that generates histogram data in the memory based on the generated signals over a time period corresponding to a plurality of light pulse cycles, wherein the histogram data corresponds to a depth-image frame and comprises accumulations of photon detection counts in a plurality of bins over the time period;
wherein the circuit generates the histogram data over a plurality of collection subframes of the depth-image frame by allocating photon detections to bins using different bin maps for different collection subframes, wherein each bin map defines a different mapping of time to bins for the light pulse cycles within its applicable collection subframe, and wherein each mapping defines a bin width for its bins so that its bin map covers a maximum detection range for the depth-image frame, wherein the bin maps comprise a first bin map and a second bin map, wherein the first and second bin maps define different bin widths for their applicable collection subframes, wherein at least one of the bin maps includes a wraparound of bins in its mapping of time to bins over the maximum detection range, wherein at least one of the bin maps uses a bin offset to define which of the bins is mapped to an initial time for the at least one bin map so that each unit of resolvable range for the histogram data maps to a unique combination of peak bin positions for the different bin maps, wherein the bin widths, the maximum detection range, and the bin offset exhibit values so that there are not any overlaps in peak bin positions within the histogram data generated using the different bin maps for each unit of resolvable range for the histogram data; and
wherein a range to an object in the field of view within the maximum detection range is resolvable based on the histogram data according to a combination of bin positions for peak bins in the histogram data with respect to the different collection subframes.

2. The system of claim 1, wherein the light pulse cycles comprise a plurality of light pulses, wherein the light pulses exhibit a pulse width; and
wherein the bin widths, the maximum detection range, the bin offset, and the pulse width exhibit values so that there are not any overlaps in peak bin positions within the histogram data generated using the different bin maps for each unit of resolvable range for the histogram data taking into consideration a maximal bin extent within the histogram data for returns from the light pulses.

3. The system of claim 1, wherein the bin widths, the maximum detection range, and the bin offset exhibit values so that the combination of peak bin positions within the histogram data for each unit of resolvable range is unique regardless of the different collection subframes to which the peak bin positions are attributable.

4. The system of claim 3, wherein the light pulse cycles comprise a plurality of light pulses, wherein the light pulses exhibit a pulse width; and
wherein the bin widths, the maximum detection range, the bin offset, and the pulse width exhibit values so that the combination of peak bin positions within the histogram data for each unit of resolvable range, taking into consideration a maximal bin extent within the histogram data for returns from the light pulses, is unique regardless of the different collection subframes to which the peak bin positions are attributable.

5. The system of claim 1, further comprising a signal processing circuit that (1) reads the histogram data out of the memory, (2) processes the read histogram data to determine the peak bin positions, and (3) resolves the range to the object according to the combination of determined peak bin positions.

6. The system of claim 5, wherein the signal processing circuit reads out the histogram data from the memory on a per depth-image frame basis.

7. The system of claim 6, wherein the signal processing circuit infers which of the collection subframes a peak bin position is attributable to based on magnitudes of accumulated photon detection counts for the peak bin positions.

8. The system of claim 5, wherein the signal processing circuit reads out the histogram data from the memory on a per collection subframe basis.

9. The system of claim 1, wherein the photodetector, memory, and circuit are resident in a pixel.

10. The system of claim 1, wherein the bin maps are based on irregular or randomized mappings of time to bins that support range disambiguation according to the combination of bin positions for peak bins in the histogram data with respect to the different collection subframes.

11. The system of claim 1, wherein the memory comprises a plurality of addresses, wherein the addresses correspond to the bins and store data that represents the accumulated photon detection counts for their corresponding bins; and wherein the circuit implements the bin maps by (1) managing a pointer that cycles through pointing at the addresses according to a reference clock whose clock interval varies based on the bin maps for the collection subframes and (2) allocating photon detections to bins based on which of the bins corresponds to the addresses pointed at by the pointer when the photon detections occur.

12. The system of claim 1, wherein the photodetector comprises a single photon avalanche diode (SPAD).

13. The system of claim 1, further comprising a plurality of instances of the photodetector, memory, and circuit to define a photodetector array that is capable of generating histogram data for respective fields of view of the photodetectors in the photodetector array.

14. The system of claim 1, wherein the photodetector, memory, and circuit are part of a lidar system.

15. A method for resolving a range to an object in a field of view of a pixel, the method comprising:
dividing a frame collection time for the pixel into a plurality of different collection subframes;
during each of the different collection subframes, (1) transmitting a plurality of light pulses into the field of view over a plurality of light pulse cycles and (2) generating histogram data in a memory based on photon detections by the pixel that occur during the collection subframe, wherein the histogram data corresponds to a depth-image frame that covers the frame collection time and comprises accumulations of photon detection counts in a plurality of bins over the frame collection time, and wherein the depth-image frame exhibits a maximum detection range; and
resolving a range to an object in the field of view within the maximum detection range based on the histogram data according to a combination of bin positions for peak bins in the histogram data with respect to the different collection subframes; and
wherein the generating step comprises allocating photon detections to bins using different bin maps for different collection subframes, wherein each bin map defines a different mapping of time to bins for the light pulse cycles within its applicable collection subframe, and wherein each mapping defines a bin width for its bins so that its bin map covers the maximum detection range, wherein the bin maps comprise a first bin map and a second bin map, wherein the first and second bin maps define different bin widths for their applicable collection subframes, wherein at least one of the bin maps includes a wraparound of bins in its mapping of time to bins over the maximum detection range, wherein at least one of the bin maps uses a bin offset to define which of the bins is mapped to an initial time for the at least one bin map so that each unit of resolvable range for the histogram data maps to a unique combination of peak bin positions for the different bin maps, wherein the bin widths, the maximum detection range, and the bin offset exhibit values so that there are not any overlaps in peak bin positions within the histogram data generated using the different bin maps for each unit of resolvable range for the histogram data.

16. An apparatus comprising:
a photodetector having a field of view, wherein the photodetector generates signals in response to incident light over time;
a memory comprising a plurality of bins; and
a circuit that maps the signals to bins within the memory according to a bin histogramming operation that uses different mappings of the bins to time for different collection subframes of a collection time window for a depth-image frame to generate time-referenced histogram data for the incident light with respect to the depth-image frame, wherein each collection subframe of the different collection subframes encompasses a plurality of light pulse cycles, and wherein each different mapping of the bins to time covers a detection range for the histogram data, wherein the bin maps comprise a first bin map and a second bin map, wherein the first and second bin maps define different bin widths for their applicable collection subframes, wherein at least one of the bin maps includes a wraparound of bins in its mapping of time to bins over a maximum detection range, wherein at least one of the bin maps uses a bin offset to define which of the bins is mapped to an initial time for the at least one bin map so that each unit of resolvable range for the histogram data maps to a unique combination of peak bin positions for the different bin maps, wherein the bin widths, the maximum detection range, and the bin offset exhibit values so that there are not any overlaps in peak bin positions within the histogram data generated using the different bin maps for each unit of resolvable range for the histogram data; and
wherein a range to an object in the field of view within the detection range is resolvable based on the histogram data according to a combination of bin positions for peak bins in the histogram data with respect to the different collection subframes.

* * * * *